US012803773B2

(12) United States Patent
Zhang et al.

(10) Patent No.: US 12,803,773 B2
(45) Date of Patent: Nov. 17, 2026

(54) TECHNIQUES FOR COMMUNICATING USING SUBBAND FULL-DUPLEX OPERATION

(71) Applicant: QUALCOMM Incorporated, San Diego, CA (US)

(72) Inventors: Qian Zhang, Basking Ridge, NJ (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 18/658,444

(22) Filed: May 8, 2024

(65) Prior Publication Data

US 2025/0350441 A1 Nov. 13, 2025

(51) Int. Cl.
*H04L 5/16* (2006.01)
*H04W 74/0833* (2024.01)

(52) U.S. Cl.
CPC ........... *H04L 5/16* (2013.01); *H04W 74/0833* (2013.01)

(58) Field of Classification Search
CPC ........... H04L 5/14; H04L 5/16; H04L 5/0094; H04W 74/006; H04W 74/0833
See application file for complete search history.

(56) References Cited

U.S. PATENT DOCUMENTS 12,244,543 B1 * 3/2025 Gao ...................... H04L 1/0003
2025/0311012 A1 * 10/2025 Ardah ................. H04W 74/006

FOREIGN PATENT DOCUMENTS

WO WO-2022211388 A1 * 10/2022 ........ H04W 72/1268
WO WO-2024035329 A1 2/2024

OTHER PUBLICATIONS

Gaal P., (Qualcomm Inc) et al., "SBFD Random Access Operation", R1-2403192, 3GPP TSG RAN WG1 #116bis, Type Discussion, NR, Duplexevo-Core, 3rd Generation Partnership Project, Mobile Competence Centre, 650, Route Des Lucioles, F-06921 Sophia-antipolis Cedex, France, vol. RAN WG1, No. Changsha, Hunan Province, CN, Apr. 15, 2024-Apr. 19, 2024, Apr. 5, 2024, XP052587173, 20 Pages, Section 2.1.2, Figures 2-2, 2-3, 2-4, 2-5 Section 2.3, Figures 2-9.

International Search Report and Written Opinion—PCT/US2025/027714—ISA/EPO—Sep. 2, 2025 (2404094WO).

(Continued)

*Primary Examiner* — Eron J Sorrell
(74) *Attorney, Agent, or Firm* — Holland & Hart LLP

(57) ABSTRACT

Methods, systems, and devices for wireless communication are described. A user equipment (UE) may receive a control signal including a random access configuration index, where the random access configuration index indicates a resource allocation pattern associated with random access occasions. In some examples, the UE may select one or more uplink resources from the random access occasions for transmitting a random access message based on a random access configuration table and the random access configuration index. In some cases, at least one of the uplink resources includes an uplink subband within a subband full duplex symbol, and the subband full duplex symbol is a downlink symbol or a flexible symbol. The UE may then transmit the random access message using the one or more uplink resources.

18 Claims, 15 Drawing Sheets

(56) References Cited

OTHER PUBLICATIONS

Ji H., et al., "Random Access on SBFD Resources", R1-2402464, 3GPP TSG RAN WG1 Meeting #116bis, Type Discussion, NR, Duplexevo-Core, 3rd Generation Partnership Project, Mobile Competence Centre, 650, Route Des Lucioles, F-06921 Sophia-antipolis Cedex, France, vol. RAN WG1, No. Changsha, Hunan Province, CN, Apr. 15, 2024-Apr. 19, 2024, Apr. 5, 2024, XP052586467, 20 Pages, Section 3.1: Figures 1,2(b): Table 2.

Pan X., (Vivo) et al., "Discussion on Random Access for Rel-19 SBFD", R1-2402240, 3GPP TSG RAN WG1 #116-bis, Type Discussion, NR, Duplexevo-Core, 3rd Generation Partnership Project, Mobile Competence Centre, 650, Route Des Lucioles, F-06921, Sophia-antipolis Cedex, France, vol. RAN WG1, No. Changsha, Hunan Province, CN, Apr. 15, 2024-Apr. 19, 2024, Apr. 5, 2024, XP052586246, 12 Pages, Section 2.3 Section 3.1.1, Section 3.1.3.

3GPP TS 38.211 Version 17.6.0, Release 17, 5G; NR; Physical Channels and Modulation, Oct. 2023, 140 pages.

3GPP TSG RAN Meeting #102, RP-234035, New WID: Evolution of NR duplex operation; Sub-band full duplex (SBFD). Edinburgh, Scotland, Dec. 11-15, 2023.

* cited by examiner

TECHNIQUES FOR COMMUNICATING USING SUBBAND FULL-DUPLEX OPERATION

FIELD OF TECHNOLOGY

The following relates to method for wireless communication, including techniques for communicating using subband full-duplex operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The systems, methods, and devices of this disclosure each have several innovative aspects, no single one of which is solely responsible for the desirable attributes disclosed herein.

A method for wireless communications by a user equipment (UE) is described. The method may include receiving a control signal including a random access configuration index, where the random access configuration index indicates a resource allocation pattern associated with random access occasions, selecting one or more uplink resources from the random access occasions for transmitting a random access message based on a random access configuration table and the random access configuration index, where at least one of the uplink resources includes an uplink subband within a subband full duplex symbol, where the subband full duplex symbol includes a downlink symbol or a flexible symbol, and transmitting the random access message using the one or more uplink resources.

A UE for wireless communications is described. The UE may include one or more memories storing processor executable code, and one or more processors coupled with the one or more memories. The one or more processors may individually or collectively be operable to execute the code to cause the UE to receive a control signal including a random access configuration index, where the random access configuration index indicates a resource allocation pattern associated with random access occasions, select one or more uplink resources from the random access occasions for transmitting a random access message based on a random access configuration table and the random access configuration index, where at least one of the uplink resources includes an uplink subband within a subband full duplex symbol, where the subband full duplex symbol includes a downlink symbol or a flexible symbol, and transmit the random access message using the one or more uplink resources.

Another UE for wireless communications is described. The UE may include means for receiving a control signal including a random access configuration index, where the random access configuration index indicates a resource allocation pattern associated with random access occasions, means for selecting one or more uplink resources from the random access occasions for transmitting a random access message based on a random access configuration table and the random access configuration index, where at least one of the uplink resources includes an uplink subband within a subband full duplex symbol, where the subband full duplex symbol includes a downlink symbol or a flexible symbol, and means for transmitting the random access message using the one or more uplink resources.

A non-transitory computer-readable medium storing code for wireless communications is described. The code may include instructions executable by one or more processors to receive a control signal including a random access configuration index, where the random access configuration index indicates a resource allocation pattern associated with random access occasions, select one or more uplink resources from the random access occasions for transmitting a random access message based on a random access configuration table and the random access configuration index, where at least one of the uplink resources includes an uplink subband within a subband full duplex symbol, where the subband full duplex symbol includes a downlink symbol or a flexible symbol, and transmit the random access message using the one or more uplink resources.

In some examples of the method, UEs, and non-transitory computer-readable medium described herein, selecting the one or more uplink resources may include operations, features, means, or instructions for selecting the one or more uplink resources from a frequency division duplex table associated with a first frequency range.

In some examples of the method, UEs, and non-transitory computer-readable medium described herein, selecting the one or more uplink resources may include operations, features, means, or instructions for selecting the one or more uplink resources from a frequency division duplex table associated with a first frequency range and selecting a second uplink resource of the one or more uplink resources from a time division duplex table associated with the first frequency range, where the second uplink resource includes an uplink slot.

In some examples of the method, UEs, and non-transitory computer-readable medium described herein, selecting the one or more uplink resources may include operations, features, means, or instructions for selecting the one or more uplink resources from one or more entries in a frequency division duplex table associated with a first frequency range, where the one or more entries may be allocated to one or more random access occasions included in one or more subband full duplex symbols that may be configured as the downlink symbol or the flexible symbol.

In some examples of the method, UEs, and non-transitory computer-readable medium described herein, the one or more entries correspond to subframe numbers or slot numbers or both.

In some examples of the method, UEs, and non-transitory computer-readable medium described herein, receiving the control signal may include operations, features, means, or instructions for receiving the control signal including an indication of a location of one or more entries that may be allocated to one or more random access occasions included in one or more subband full duplex symbols that may be configured as a downlink symbol or a flexible symbol.

In some examples of the method, UEs, and non-transitory computer-readable medium described herein, the location corresponds to subframe numbers or slot numbers or both. In some examples of the method, UEs, and non-transitory computer-readable medium described herein, the indication of the location includes an indication of a time offset field. In some examples of the method, UEs, and non-transitory computer-readable medium described herein, the UE includes a half-duplex UE.

A method for wireless communications by a UE is described. The method may include receiving a configuration message including a first set of configuration parameters for a random access message payload for one or more subband full duplex symbols and a second set of configuration parameters for a random access message payload for one or more non-subband full duplex symbols, where the one or more subband full duplex symbols includes a downlink symbol or a flexible symbol, selecting one or more uplink resources for transmitting a random access message based on the first set of configuration parameters and the second set of configuration parameters, and transmitting the random access message using the one or more uplink resources.

A UE for wireless communications is described. The UE may include one or more memories storing processor executable code, and one or more processors coupled with the one or more memories. The one or more processors may individually or collectively be operable to execute the code to cause the UE to receive a configuration message including a first set of configuration parameters for a random access message payload for one or more subband full duplex symbols and a second set of configuration parameters for a random access message payload for one or more non-subband full duplex symbols, where the one or more subband full duplex symbols includes a downlink symbol or a flexible symbol, select one or more uplink resources for transmitting a random access message based on the first set of configuration parameters and the second set of configuration parameters, and transmit the random access message using the one or more uplink resources.

Another UE for wireless communications is described. The UE may include means for receiving a configuration message including a first set of configuration parameters for a random access message payload for one or more subband full duplex symbols and a second set of configuration parameters for a random access message payload for one or more non-subband full duplex symbols, where the one or more subband full duplex symbols includes a downlink symbol or a flexible symbol, means for selecting one or more uplink resources for transmitting a random access message based on the first set of configuration parameters and the second set of configuration parameters, and means for transmitting the random access message using the one or more uplink resources.

A non-transitory computer-readable medium storing code for wireless communications is described. The code may include instructions executable by one or more processors to receive a configuration message including a first set of configuration parameters for a random access message payload for one or more subband full duplex symbols and a second set of configuration parameters for a random access message payload for one or more non-subband full duplex symbols, where the one or more subband full duplex symbols includes a downlink symbol or a flexible symbol, select one or more uplink resources for transmitting a random access message based on the first set of configuration parameters and the second set of configuration parameters, and transmit the random access message using the one or more uplink resources.

In some examples of the method, UEs, and non-transitory computer-readable medium described herein, selecting the one or more uplink resources may include operations, features, means, or instructions for selecting a first uplink resource of the one or more uplink resources based on applying a first frequency offset in accordance with the first set of configuration parameters and selecting a second uplink resource associated with the one or more non-subband full duplex symbols based on applying a second frequency offset in accordance with the second set of configuration parameters, the second frequency offset being different from the first frequency offset.

In some examples of the method, UEs, and non-transitory computer-readable medium described herein, a quantity of physical resource blocks associated with a first uplink resource of the one or more uplink resources may be less or more than a quantity of physical resource blocks associated with a second uplink resource associated with the one or more non-subband full duplex symbols.

In some examples of the method, UEs, and non-transitory computer-readable medium described herein, a quantity of symbols associated with a first uplink resource of the one or more uplink resources may be greater or less than a quantity of symbols associated with a second uplink resource associated with the one or more non-subband full duplex symbols.

In some examples of the method, UEs, and non-transitory computer-readable medium described herein, selecting the one or more uplink resources may include operations, features, means, or instructions for selecting a first uplink resource of the one or more uplink resources based on applying a first time offset in accordance with the first set of configuration parameters and selecting a second uplink resource associated with the one or more non-subband full duplex symbols based on applying a second time offset in accordance with the second set of configuration parameters, the second time offset being different from the first time offset.

In some examples of the method, UEs, and non-transitory computer-readable medium described herein, a frequency domain multiplexing parameter associated with a first uplink resource of the one or more uplink resources may be different from a frequency domain multiplexing parameter associated with a second uplink resource associated with the one or more non-subband full duplex symbols.

A method for wireless communications by a network entity is described. The method may include transmitting, to a UE, a control signal including a random access configuration index, where the random access configuration index indicates a resource allocation pattern associated with random access occasions and receiving a random access message using one or more uplink resources, where the one or more uplink resources are selected from the random access occasions based on a random access configuration table and the random access configuration index, and where at least one of the uplink resources includes an uplink subband within a subband full duplex symbol, where the subband full duplex symbol includes a downlink symbol or a flexible symbol.

A network entity for wireless communications is described. The network entity may include one or more memories storing processor executable code, and one or more processors coupled with the one or more memories. The one or more processors may individually or collectively be operable to execute the code to cause the network entity to transmit, to a UE, a control signal including a random access configuration index, where the random access configuration index indicates a resource allocation pattern associated with random access occasions and receive a random access message using one or more uplink resources, where the one or more uplink resources are selected from the random access occasions based on a random access configuration table and the random access configuration index, and where at least one of the uplink resources includes an uplink subband within a subband full duplex symbol, where the subband full duplex symbol includes a downlink symbol or a flexible symbol.

Another network entity for wireless communications is described. The network entity may include means for transmitting, to a UE, a control signal including a random access configuration index, where the random access configuration index indicates a resource allocation pattern associated with random access occasions and means for receiving a random access message using one or more uplink resources, where the one or more uplink resources are selected from the random access occasions based on a random access configuration table and the random access configuration index, and where at least one of the uplink resources includes an uplink subband within a subband full duplex symbol, where the subband full duplex symbol includes a downlink symbol or a flexible symbol.

A non-transitory computer-readable medium storing code for wireless communications is described. The code may include instructions executable by one or more processors to transmit, to a UE, a control signal including a random access configuration index, where the random access configuration index indicates a resource allocation pattern associated with random access occasions and receive a random access message using one or more uplink resources, where the one or more uplink resources are selected from the random access occasions based on a random access configuration table and the random access configuration index, and where at least one of the uplink resources includes an uplink subband within a subband full duplex symbol, where the subband full duplex symbol includes a downlink symbol or a flexible symbol.

In some examples of the method, network entities, and non-transitory computer-readable medium described herein, the one or more uplink resources from a frequency division duplex table associated with a first frequency range.

In some examples of the method, network entities, and non-transitory computer-readable medium described herein, the one or more uplink resources may be selected from a frequency division duplex table associated with a first frequency range, a second uplink resource of the one or more uplink resources may be selected from a time division duplex table associated with the first frequency range, and the second uplink resource includes an uplink slot.

In some examples of the method, network entities, and non-transitory computer-readable medium described herein, the one or more uplink resources may be selected from one or more entries in a frequency division duplex table associated with a first frequency range and the one or more entries may be allocated to one or more random access occasions included in one or more subband full duplex symbols that may be configured as the downlink symbol or the flexible symbol. In some examples of the method, network entities, and non-transitory computer-readable medium described herein, the one or more entries correspond to subframe numbers or slot numbers or both.

In some examples of the method, network entities, and non-transitory computer-readable medium described herein, transmitting the control signal may include operations, features, means, or instructions for transmitting the control signal including an indication of a location of one or more entries that may be allocated to one or more random access occasions included in one or more subband full duplex symbols that may be configured as a downlink symbol or a flexible symbol.

In some examples of the method, network entities, and non-transitory computer-readable medium described herein, the location corresponds to subframe numbers or slot numbers or both. In some examples of the method, network entities, and non-transitory computer-readable medium described herein, the indication of the location includes an indication of a time offset field.

In some examples of the method, network entities, and non-transitory computer-readable medium described herein, the UE includes a half-duplex UE.

A method for wireless communications by a network entity is described. The method may include transmitting a configuration message including a first set of configuration parameters for a random access message payload for one or more subband full duplex symbols and a second set of configuration parameters for a random access message payload for one or more non-subband full duplex symbols, where the one or more subband full duplex symbols includes a downlink symbol or a flexible symbol and receiving a random access message using one or more uplink resources, where the one or more uplink resources are selected based on the first set of configuration parameters and the second set of configuration parameters.

A network entity for wireless communications is described. The network entity may include one or more memories storing processor executable code, and one or more processors coupled with the one or more memories. The one or more processors may individually or collectively be operable to execute the code to cause the network entity to transmit a configuration message including a first set of configuration parameters for a random access message payload for one or more subband full duplex symbols and a second set of configuration parameters for a random access message payload for one or more non-subband full duplex symbols, where the one or more subband full duplex symbols includes a downlink symbol or a flexible symbol and receive a random access message using one or more uplink resources, where the one or more uplink resources are selected based on the first set of configuration parameters and the second set of configuration parameters.

Another network entity for wireless communications is described. The network entity may include means for transmitting a configuration message including a first set of configuration parameters for a random access message payload for one or more subband full duplex symbols and a second set of configuration parameters for a random access message payload for one or more non-subband full duplex symbols, where the one or more subband full duplex symbols includes a downlink symbol or a flexible symbol and means for receiving a random access message using one or more uplink resources, where the one or more uplink resources are selected based on the first set of configuration parameters and the second set of configuration parameters.

A non-transitory computer-readable medium storing code for wireless communications is described. The code may include instructions executable by one or more processors to transmit a configuration message including a first set of configuration parameters for a random access message payload for one or more subband full duplex symbols and a second set of configuration parameters for a random access message payload for one or more non-subband full duplex symbols, where the one or more subband full duplex symbols includes a downlink symbol or a flexible symbol and receive a random access message using one or more uplink resources, where the one or more uplink resources are selected based on the first set of configuration parameters and the second set of configuration parameters.

In some examples of the method, network entities, and non-transitory computer-readable medium described herein, a first uplink resource of the one or more uplink resources may be selected based on applying a first frequency offset in accordance with the first set of configuration parameters and a second uplink resource associated with the one or more non-subband full duplex symbols may be selected based on applying a second frequency offset in accordance with the second set of configuration parameters, the second frequency offset being different from the first frequency offset.

In some examples of the method, network entities, and non-transitory computer-readable medium described herein, a quantity of physical resource blocks associated with a first uplink resource of the one or more uplink resources may be less or more than a quantity of physical resource blocks associated with a second uplink resource associated with the one or more non-subband full duplex symbols.

In some examples of the method, network entities, and non-transitory computer-readable medium described herein, a quantity of symbols associated with a first uplink resource of the one or more uplink resources may be greater or less than a quantity of symbols associated with a second uplink resource associated with the one or more non-subband full duplex symbols.

In some examples of the method, network entities, and non-transitory computer-readable medium described herein, a first uplink resource of the one or more uplink resources may be selected based on applying a first time offset in accordance with the first set of configuration parameters and a second uplink resource associated with the one or more non-subband full duplex symbols may be selected based on applying a second time offset in accordance with the second set of configuration parameters, the second time offset being different from the first time offset.

In some examples of the method, network entities, and non-transitory computer-readable medium described herein, a frequency domain multiplexing parameter associated with a first uplink resource of the one or more uplink resources may be different from a frequency domain multiplexing parameter associated with a second uplink resource associated with the one or more non-subband full duplex symbols.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Figure 1:
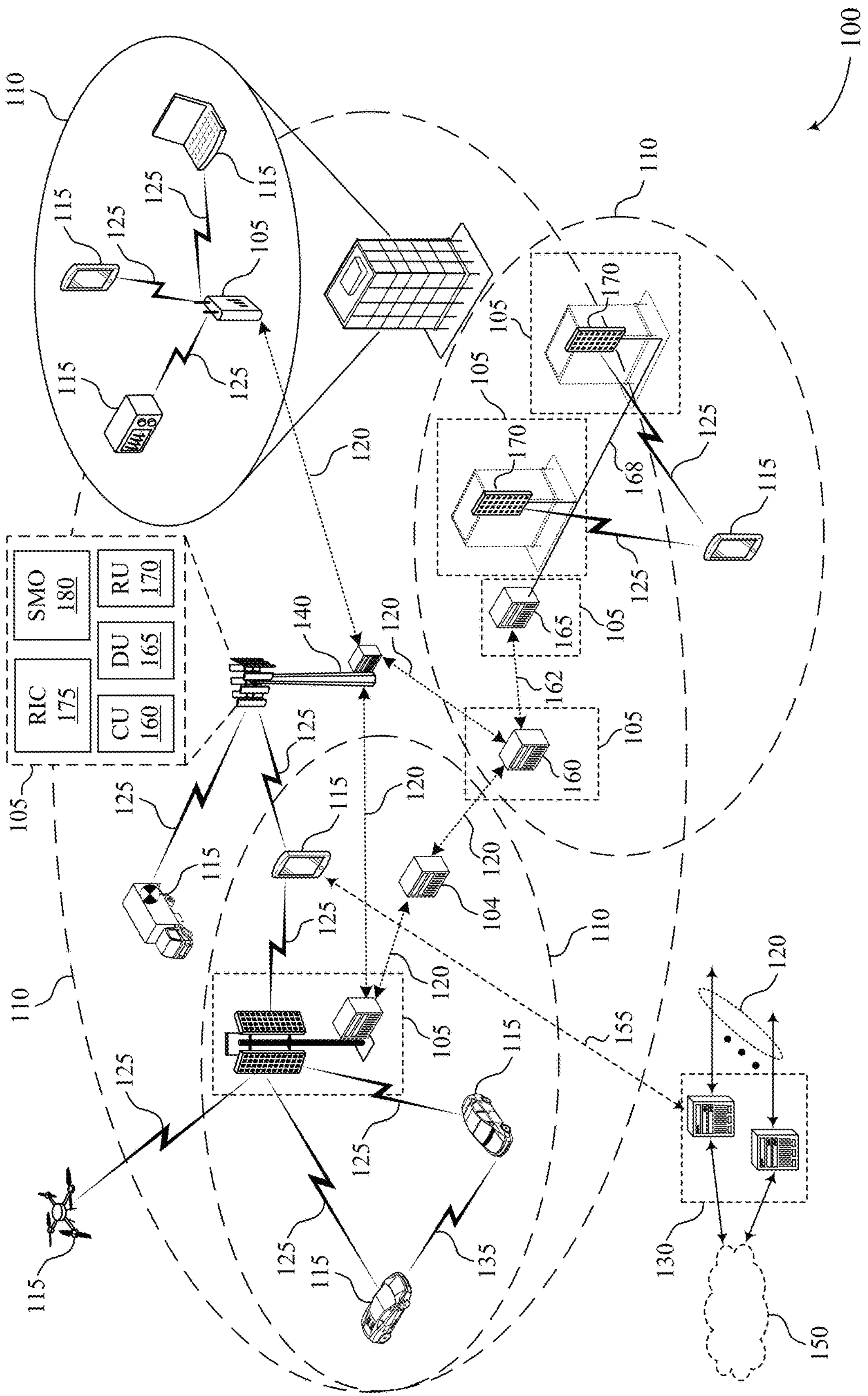
FIG. 1 shows an example of a wireless communications system that supports techniques for communicating using subband full-duplex operation in accordance with one or more aspects of the present disclosure.

In some wireless communications systems, a network entity may schedule random access occasions for a user equipment (UE). For example, the network entity may schedule, via a control message, resource allocation pattern associated with random access occasions. In some cases, a network entity may schedule transmissions in accordance with a subband full duplex operation, where the network entity reserves some subbands for uplink transmissions and some subbands for downlink transmissions within a same symbol or slot, referred to herein as an subband full duplex symbol or slot. In such examples, a network entity may be limited by which symbols the network entity can configure random access occasions on. That is, a network entity may be unable to allocate random access occasions on uplink subbands in a downlink symbol without an understanding of how to select the resources for such random access occasions.

According to the aspects depicted herein, the UE may select one or more uplink resources from the random access occasions for transmitting a random access message based on a random access configuration table and a random access configuration index indicated in a control signal. As discussed herein, at least one of the uplink resources may include an uplink subband within a subband full duplex symbol, and the subband full duplex symbol may include a downlink symbol or a flexible symbol. Additionally, or alternatively, the UE may receive a configuration message including a first set of configuration parameters for a random access message payload for one or more subband full duplex symbols and a second set of configuration parameters for a random access message payload for one or more non-subband full duplex symbols. The UE may then select one or more uplink resources for transmitting a random access message based on the first set of configuration parameters and the second set of configuration parameters. The UE may then transmit the random access message using the selected uplink resources.

Using subband full duplex symbols for transmission may provide for an increase in uplink duty cycle leading to latency reduction (e.g., it is possible to transmit uplink signal in uplink subband in downlink slots or flexible slots, which can enable latency savings) and uplink coverage improvement. In some cases, using subband full duplex operation may enhance system capacity, resource utilization and spectrum efficiency, and enable flexible and dynamic uplink or downlink resource adaption according to uplink or downlink traffic in a robust manner. Thus, subband full duplex operation may provide uplink coverage enhancement where a UE can utilize the uplink subband in consecutive subband full duplex slots to enable physical random access channel and random access message repetition. Additionally, or alternatively, using subband full duplex operation may provide for a reduction of random access channel collision probability and enable the inclusion of additional resource occasions within the uplink-subband. Thus, the techniques depicted herein may improve random access channel capacity and reduce contention-based collision probability while enabling more UEs to access the network. Additionally, or alternatively, the aspects depicted herein provide for random access latency reduction. Including random access occasions in the subband full duplex symbols or slots may reduce latency for random access procedure and potentially for initial access and handover.

Aspects of the disclosure are initially described in the context of wireless communications systems. Aspects of the disclosure are further illustrated by and described with reference to a process flow. Aspects of the disclosure are further illustrated by and described with reference to apparatus diagrams, system diagrams, and flowcharts that relate to techniques for communicating using subband full-duplex operation.

FIG. 1 shows an example of a wireless communications system 100 that supports techniques for communicating using subband full-duplex operation in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

For instance, an access network (AN) or RAN may include communications between access nodes (e.g., an IAB donor), IAB node(s) 104, and one or more UEs 115. The IAB donor may facilitate connection between the core network 130 and the AN (e.g., via a wired or wireless connection to the core network 130). That is, an IAB donor may refer to a RAN node with a wired or wireless connection to the core network 130. The IAB donor may include one or more of a CU 160, a DU 165, and an RU 170, in which case the CU 160 may communicate with the core network 130 via an interface (e.g., a backhaul link). The IAB donor and IAB node(s) 104 may communicate via an F1 interface according to a protocol that defines signaling messages (e.g., an F1 AP protocol). Additionally, or alternatively, the CU 160 may communicate with the core network 130 via an interface, which may be an example of a portion of a backhaul link, and may communicate with other CUs (e.g., including a CU 160 associated with an alternative IAB donor) via an Xn-C interface, which may be an example of another portion of a backhaul link.

IAB node(s) 104 may refer to RAN nodes that provide IAB functionality (e.g., access for UEs 115, wireless self-backhauling capabilities). A DU 165 may act as a distributed scheduling node towards child nodes associated with the IAB node(s) 104, and the IAB-MT may act as a scheduled node towards parent nodes associated with IAB node(s) 104. That is, an IAB donor may be referred to as a parent node in communication with one or more child nodes (e.g., an IAB donor may relay transmissions for UEs through other IAB node(s) 104). Additionally, or alternatively, IAB node(s) 104 may also be referred to as parent nodes or child nodes to other IAB node(s) 104, depending on the relay chain or configuration of the AN. The IAB-MT entity of IAB node(s) 104 may provide a Uu interface for a child IAB node (e.g., the IAB node(s) 104) to receive signaling from a parent IAB node (e.g., the IAB node(s) 104), and a DU interface (e.g., a DU 165) may provide a Uu interface for a parent IAB node to signal to a child IAB node or UE 115.

For example, IAB node(s) 104 may be referred to as parent nodes that support communications for child IAB nodes, or may be referred to as child IAB nodes associated with IAB donors, or both. An IAB donor may include a CU 160 with a wired or wireless connection (e.g., backhaul communication link(s) 120) to the core network 130 and may act as a parent node to IAB node(s) 104. For example, the DU 165 of an IAB donor may relay transmissions to UEs 115 through IAB node(s) 104, or may directly signal transmissions to a UE 115, or both. The CU 160 of the IAB donor may signal communication link establishment via an F1 interface to IAB node(s) 104, and the IAB node(s) 104 may schedule transmissions (e.g., transmissions to the UEs 115 relayed from the IAB donor) through one or more DUs (e.g., DUs 165). That is, data may be relayed to and from IAB node(s) 104 via signaling via an NR Uu interface to MT of IAB node(s) 104 (e.g., other IAB node(s)). Communications with IAB node(s) 104 may be scheduled by a DU 165 of the IAB donor or of IAB node(s) 104.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing and time division duplexing component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in a frequency division duplexing mode) or may be configured to carry downlink and uplink communications (e.g., in a time division duplexing mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., Nr) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may support synchronous or asynchronous operation. For synchronous operation, network entities 105 (e.g., base stations 140) may have similar frame timings, and transmissions from different network entities (e.g., different ones of the network entities 105) may be approximately aligned in time. For asynchronous operation, network entities 105 may have different frame timings, and transmissions from different network entities (e.g., different ones of network entities 105) may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some wireless communications systems, a UE and a network entity may communicate in accordance with a subband full duplex operation. In such operation, the network entity reserves some subbands for uplink transmissions and some subbands for downlink transmissions within a same slot, referred to herein as an subband full duplex slot. Some UEs may be half duplex UEs, but may receive an indication of the subband full duplex slots or symbols. Such UEs may be referred to as subband full duplex aware UEs. If random access is allowed in subband full duplex symbols for subband full duplex-aware UEs, it may potentially reduce the random access latency, reduce the physical random access channel collision probability and/or improve the coverage of physical random access channel and random access message transmission (e.g., Msg 3). In some cases, the physical random access channel and random access message transmissions in uplink subband in subband full duplex symbols may cause UE-to-UE cross link interference.

In some examples, random access in subband full duplex symbols may be included in the physical random access channel and random access message transmissions in symbols configured as downlink in TDD-UL-DL-ConfigCommon. In case of a subband non-overlapping full duplex operation at the network entity side within a time division duplexing carrier, the network entity may specify semi-static indication of time location of subband full duplex subbands to UEs in a connect mode (e.g., RRC_CONNECTED mode). In some examples, a system information block may include an indication of time location of subband full duplex subbands. The network entity may specify semi-static indication of frequency domain location of subband full duplex subbands to UEs in a connected mode (RRC_CONNECTED mode). In some examples, the network entity may indicate frequency domain location of subband full duplex subbands in a system information block.

The techniques depicted herein provide for subband full duplex operation to support random access in subband full duplex symbols by UEs in a connected mode (RRC CONNECTED mode). Additionally, or alternatively, the techniques depicted herein provide for techniques to implement subband full duplex operation at UE in an idle or inactive mode (RRC_IDLE/INACTIVE mode for random access). In some examples, aspects of the present disclosure provide for UE transmission, reception and measurement behavior and procedures in subband full duplex symbols and/or non-subband full duplex symbols for subband full duplex aware UEs.

According to one or more aspects. a UE 115 may receive a control signal including a random access configuration index, where the random access configuration index indicates a resource allocation pattern associated with random access occasions. In some examples, the UE may select one or more uplink resources from the random access occasions for transmitting a random access message based on a random access configuration table and the random access configuration index. In some cases, at least one of the uplink resources may include an uplink subband within a subband full duplex symbol, and the subband full duplex symbol may include a downlink symbol or a flexible symbol. The UE may then transmit the random access message using the one or more uplink resources.

In some examples, a UE 115 may receive a configuration message including a first set of configuration parameters for a random access message payload for one or more subband full duplex symbols and a second set of configuration parameters for a random access message payload for one or more non-subband full duplex symbols. In such cases, the one or more subband full duplex symbols may include a downlink symbol or a flexible symbol. The UE 115 may select one or more uplink resources for transmitting a random access message based on the first set of configuration parameters and the second set of configuration parameters. The UE 115 may then transmit the random access message using the one or more uplink resources.

Figure 2:
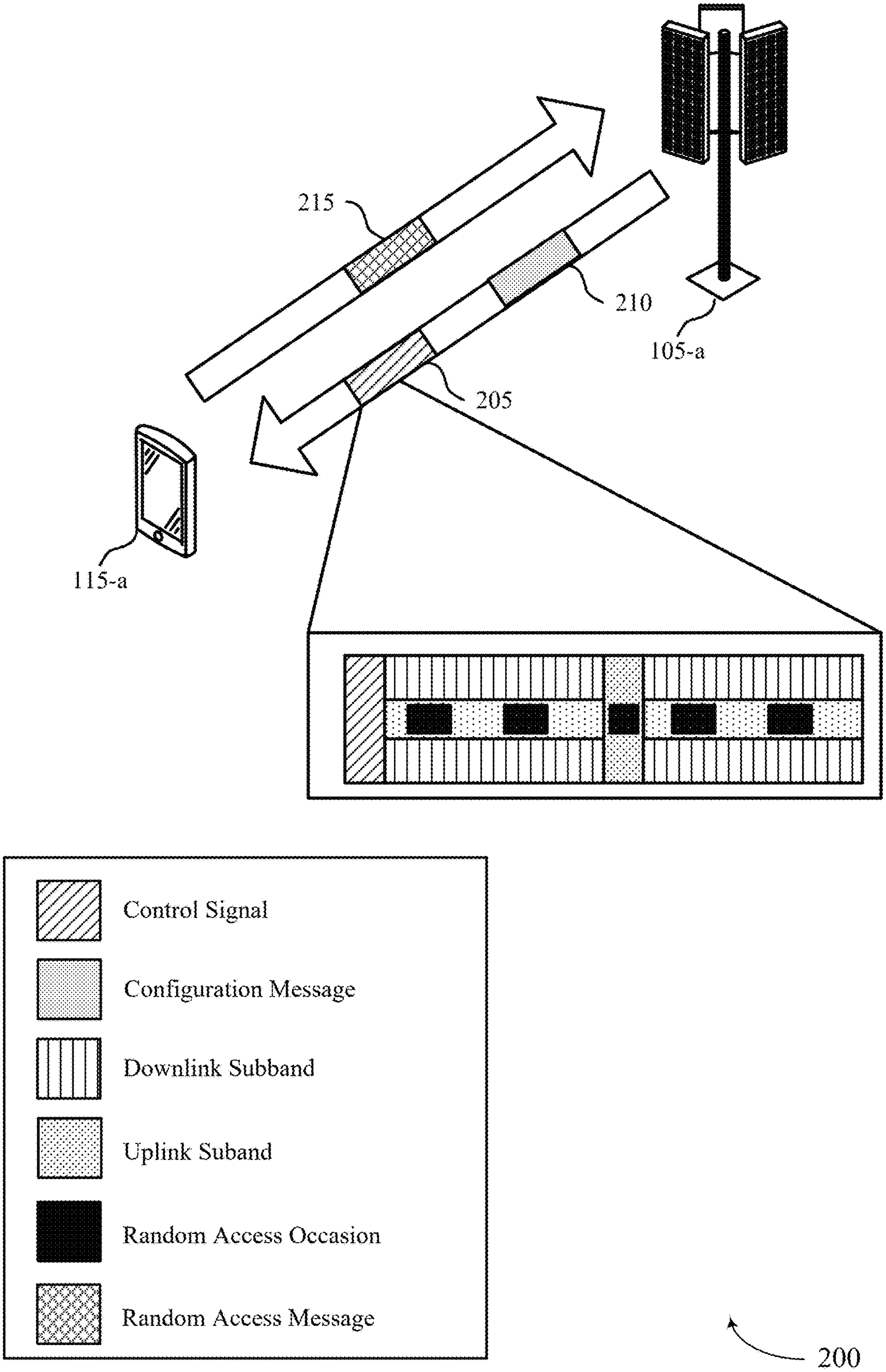
FIG. 2 shows an example of a wireless communications system that supports techniques for communicating using subband full-duplex operation in accordance with one or more aspects of the present disclosure.

FIG. 2 shows an example of a wireless communications system 200 that supports techniques for communicating using subband full-duplex operation in accordance with one or more aspects of the present disclosure. The wireless communications system 200 may implement or may be implemented by aspects of the wireless communications system 100. For example, the wireless communications system 200 may include a UE 115-*a* and a network entity 105-*a*, which may be examples of corresponding devices described with reference to FIG. 1.

The network entity 105-*a* may transmit a control message 205 that includes a random access configuration index. In some examples, the random access configuration index may indicate a resource allocation pattern associated with random access occasions. In some cases, the network entity 105-*a* may operate in a subband full duplex mode.

According to one or more aspects depicted herein, a network entity 105-*a* may schedule transmissions (e.g., at a UE 115) in accordance with a subband full duplex operation. The subband full duplex operation may include downlink and uplink subband non-overlapping full-duplex at the network entity side within a time division duplexing band. That is, the subband full duplex operation may modify a time division duplexing band to support full-duplex enhancement at the network entity 105, where the time division duplexing band includes slots where some subbands in the slot are reserved for downlink transmissions and other non-overlapping subbands are reserved for uplink transmissions. The UE 115 may operate in half-duplex in accordance with the subband full duplex operation, and the network entity 105 may schedule transmissions (e.g., in full-duplex mode) without restriction on frequency ranges.

In some examples of subband full duplex operation, some subbands in some downlink (D) and special(S) slots may be reserved for uplink transmission. A network entity 105 that schedules in accordance with an subband full duplex operation. The subband full duplex operation may support reduced uplink latencies, more sleeping opportunities at the UE 115 (e.g., a low-power UE), or both. In some examples, a DDDSU (downlink-downlink-downlink-special-uplink) slot pattern in time division duplexing may be modified to implement an subband full duplex operation.

As depicted in the example of FIG. 2, the network entity 105-*a* may schedule transmissions of downlink (e.g., physical downlink shared channel) or uplink (e.g., physical uplink shared channel) messages in accordance with time division duplexing. In some examples, the network entity 105 may use a DDDSU pattern and may operate in accordance with a subband full duplex mode. In some examples, the DDDSU slot pattern may include, at the start of each slot in the pattern, a time duration reserved for control messages (e.g., in DCI), which may precede a time duration reserved for downlink in the D and S slots or may precede a time duration reserved for uplink in the U slot. In some examples, the 4th slot (e.g., the S slot) of the DDDSU slot pattern may include a duration reserved for downlink followed by a duration reserved for guard symbols. The fifth slot (e.g., the U slot) may include a time duration reserved for uplink followed by a time duration reserved for uplink control messages. In the subband full duplex mode, the network entity 105-*a* may configure the UE 115-*a* to identify random access occasions included in an uplink subband of a subband full duplex symbol.

In some examples, the UE 115-*a* may use random access configuration tables for unpaired spectrum (e.g., Table 6.3.3.2-3 for frequency range 1 (FR1), Table 6.3.3.2-2 for FRI frequency division duplexing table and Table 6.3.3.2-4 for FR2 for unpaired spectrum time division duplexing tables). With subband full duplex symbols configured on D symbols or flexible (F) symbols, then the network entity 105-*a* may have the opportunity to allocate random access occasions on more slots (more than the slots that are uplink only). To accurately read the random access channel table to identify the resource allocation patterns for subband full duplex operation, the UE 115-*a* may select one or more uplink resources from the random access occasions for transmitting a random access message based part on a random access configuration table and the random access configuration index. In some examples, at least one of the uplink resources may include an uplink subband within a subband full duplex symbol, where the subband full duplex symbol may include a downlink symbol or a flexible symbol. The UE 115-*a* may then transmit the random access message 215 using the one or more uplink resources (e.g., on the random access occasions).

In some examples, the UE 115-*a* may use a single FRI frequency division duplexing table for random access configuration. In such cases, the network entity 105-*a* and the UE 115-*a* may be aligned on the same time location on uplink slots with other UEs 115 using time division duplexing table. For example, the UE 115-*a* may select the one or more uplink resources from a frequency division duplex table associated with a first frequency range.

In some examples, the UE 115-*a* may read subband full duplex random access occasion locations from FR1 frequency division duplexing table (drop uplink slots random access occasion locations). The UE 115-*a* may further read uplink random access occasion locations from FR1 time division duplexing table. For example, the UE 115-*a* may select the one or more uplink resources from a frequency division duplex table associated with a first frequency range, and may select a second uplink resource of the one or more uplink resources from a time division duplex table associated with the first frequency range. In some examples, the second uplink resource may include an uplink slot.

Additionally, or alternatively, the network entity 105-*a* may add extra rows/entries (in the random access channel table) for allocating random access occasions on subband full duplex slots for FR1 and FR2 time division duplexing tables. In some examples, a portion of FR2 time division duplexing random access channel table may be described as Table 1.

TABLE 1

| Configuration Index | Preamble Format | x | y | Slot | Starting Symbol | Number of slots | Number of time domain occasions | Duration |
|---|---|---|---|---|---|---|---|---|
| 0 | A1 | 16 | 1 | 4, 9, . . . | 0 | 2 | 6 | 2 |
| 1 | A1 | 16 | 1 | 3, 7, . . . | 0 | 1 | 6 | 2 |
| 2 | A1 | 8 | 1, 2 | 9, 19, . . . | 0 | 2 | 6 | 2 |
| 3 | A1 | 8 | 1 | 4, 9, . . . | 0 | 2 | 6 | 2 |
| 4 | A1 | 8 | 1 | 3, 7, . . . | 0 | 1 | 6 | 2 |
| 5 | A1 | 4 | 1 | 4, 9, . . . | 0 | 1 | 6 | 2 |
| 6 | A1 | 4 | 1 | 4, 9, . . . | 0 | 2 | 6 | 2 |
| . . . | . . . | . . . | . . . | . . . | . . . | . . . | . . . | . . . |

Upon adding the new entry to Table 1, in one example, a portion of the updated FR2 time division duplexing random access channel table may be described as Table 2.

TABLE 2

| Configuration Index | Preamble Format | x | y | Slot | Starting Symbol | Number of slots | Number of time domain occasions | Duration |
|---|---|---|---|---|---|---|---|---|
| 0 | A1 | 16 | 1 | 0, 1, 2, 3, 4, 5, 6, 7, 8, 9, . . . | 0 | 2 | 6 | 2 |
| 1 | A1 | 16 | 1 | 0, 1, 2, 3, 4, 5, 6, 7, . . . | 0 | 1 | 6 | 2 |
| 2 | A1 | 8 | 1, 2 | 0, 1, 2, 3, 4, 5, 6, 7, 8, 9, 19, . . . | 0 | 2 | 6 | 2 |
| 3 | A1 | 8 | 1 | 0,, 1, 2, 3, 4, 5, 6, 7, 8, 9 . . . | 0 | 2 | 6 | 2 |
| 4 | A1 | 8 | 1 | 0, 1, 2, 3, 4, 5, | 0 | 1 | 6 | 2 |

TABLE 2-continued

| Configuration Index | Preamble Format | x | y | Slot | Starting Symbol | Number of slots | Number of time domain occasions | Duration |
|---|---|---|---|---|---|---|---|---|
| | | | | 6, 7, 8, 9 . . . | | | | |
| 5 | A1 | 4 | 1 | 0, 1, 2, 3, 4, 5, 6, 7, 8, 9 . . . | 0 | 1 | 6 | 2 |
| 6 | A1 | 4 | 1 | 0, 1, 2, 3, 4, 5, 6, 7, 8, 9 . . . | 0 | 2 | 6 | 2 |
| . . . | . . . | . . . | . . . | . . . | . . . | . . . | . . . | . . . |

As depicted in the example of Table 2, with the newly added entries, the UE 115-*a* may determine that slots 0, 1, 2, 3, 4, 5, 6, 7, 8, and 9 include random access occasions for uplink (instead of slots 4 and 9). The UE 115-*a* may read the subframe number for FR1 and the slot number for FR2. As one example, for periodicity of 160 ms, the network entity 105-*a* may add a row/entry of slot number 0, 1, 2, 3, 4, 5, 6, 7, 8, 9 . . . to have more random access occasions on subband full duplex downlink symbols. For instance, the UE 115-*a* may select the one or more uplink resources from one or more entries in a frequency division duplex table associated with a first frequency range, where the one or more entries are allocated to one or more random access occasions included in one or more subband full duplex symbols that are configured as the downlink symbol or the flexible symbol. In some cases, the one or more entries correspond to subframe numbers or slot numbers or both.

Additionally, or alternatively, the network entity 105-*a* may define a parameter(s) for the UE 115-*a* to determine the subframe number or slot number for random access occasions in subband full duplex symbols. The network entity 105-*a* may include additional subframe number or slot number for subband full duplex random access occasions in a new field of indication. For example, the UE 115-*a* may receive the control signal including an indication of a location of one or more entries that are allocated to one or more random access occasions included in one or more subband full duplex symbols that are configured as a downlink symbol or a flexible symbol. In such cases, the location may correspond to subframe numbers or slot numbers or both. Additionally, the indication of the location may include an indication of a time offset field. For instance, the network entity 105-*a* may define a time offset field to determine additional the subframe number or slot number for random access occasions in subband full duplex symbols.

According to one or more aspects depicted herein, the UE 115-*a* may receive a configuration message 210 indicating parameters for random access occasions included in subband full duplex symbols. The UE 115-*a* may implement the techniques depicted herein to identify the random access channel configuration for subband full duplex symbols. In some examples, the UE 115-*a* may receive a configuration message 210 including a first set of configuration parameters for a random access message payload for one or more subband full duplex symbols and a second set of configuration parameters for a random access message payload for one or more non-subband full duplex symbols. In some cases, the one or more subband full duplex symbols may include a downlink symbol or a flexible symbol. For instance, the network entity 105-*a* may configure two formats for Msg A payload of physical uplink shared channel for subband full duplex symbols and non-subband full duplex symbols. The UE 115-*a* may select one or more uplink resources for transmitting a random access message based on the first set of configuration parameters and the second set of configuration parameters. The UE 115-*a* may then transmit the random access message 215 using the one or more uplink resources.

In some examples, a random access message (Msg A on physical uplink shared channel) on the subband full duplex symbol may allocate different frequency offset as a random access message included in an uplink or flexible symbol. In such cases, the UE 115-*a* may select a first uplink resource of the one or more uplink resources based on applying a first frequency offset in accordance with the first set of configuration parameters. The UE 115-*a* may further select a second uplink resource associated with the one or more non-subband full duplex symbols based on applying a second frequency offset in accordance with the second set of configuration parameters, the second frequency offset being different from the first frequency offset.

In some examples, a random access message (Msg A on physical uplink shared channel) included in the subband full duplex symbol may be associated with (may be less or more) less physical resource blocks for frequency allocation than the random access message (Msg A on physical uplink shared channel) included in an uplink or flexible symbol. For example, a quantity of physical resource blocks associated with a first uplink resource of the one or more uplink resources may be less or more than a quantity of physical resource blocks associated with a second uplink resource associated with the one or more non-subband full duplex symbols.

In some examples, a random access message (Msg A on physical uplink shared channel) included in the subband full duplex symbol may allocate more symbols for time allocation than a random access message (Msg A on physical uplink shared channel) included in the uplink or flexible symbol. For instance, a quantity of symbols associated with a first uplink resource of the one or more uplink resources may be greater or less than a quantity of symbols associated with a second uplink resource associated with the one or more non-subband full duplex symbols.

Additionally, or alternatively, a random access message (Msg A on physical uplink shared channel) included in the subband full duplex symbol may configure different offsets for time allocation than a random access message (Msg A on physical uplink shared channel) included in the uplink or flexible symbols. In such cases, the UE 115-*a* may select a first uplink resource of the one or more uplink resources based on applying a first time offset in accordance with the first set of configuration parameters, and may select a second uplink resource associated with the one or more non-subband full duplex symbols based on applying a second time offset in accordance with the second set of configuration parameters, the second time offset being different from the first time offset.

In some cases, a random access message (Msg A on physical uplink shared channel) included in the subband full duplex symbol may configure different frequency division multiplexing parameter (e.g., smaller frequency division multiplexing factor for frequency allocation as a random access message included in an uplink symbol). For instance, a frequency domain multiplexing parameter associated with a first uplink resource of the one or more uplink resources may be different from a frequency domain multiplexing parameter associated with a second uplink resource associated with the one or more non-subband full duplex symbols.

Figure 3:
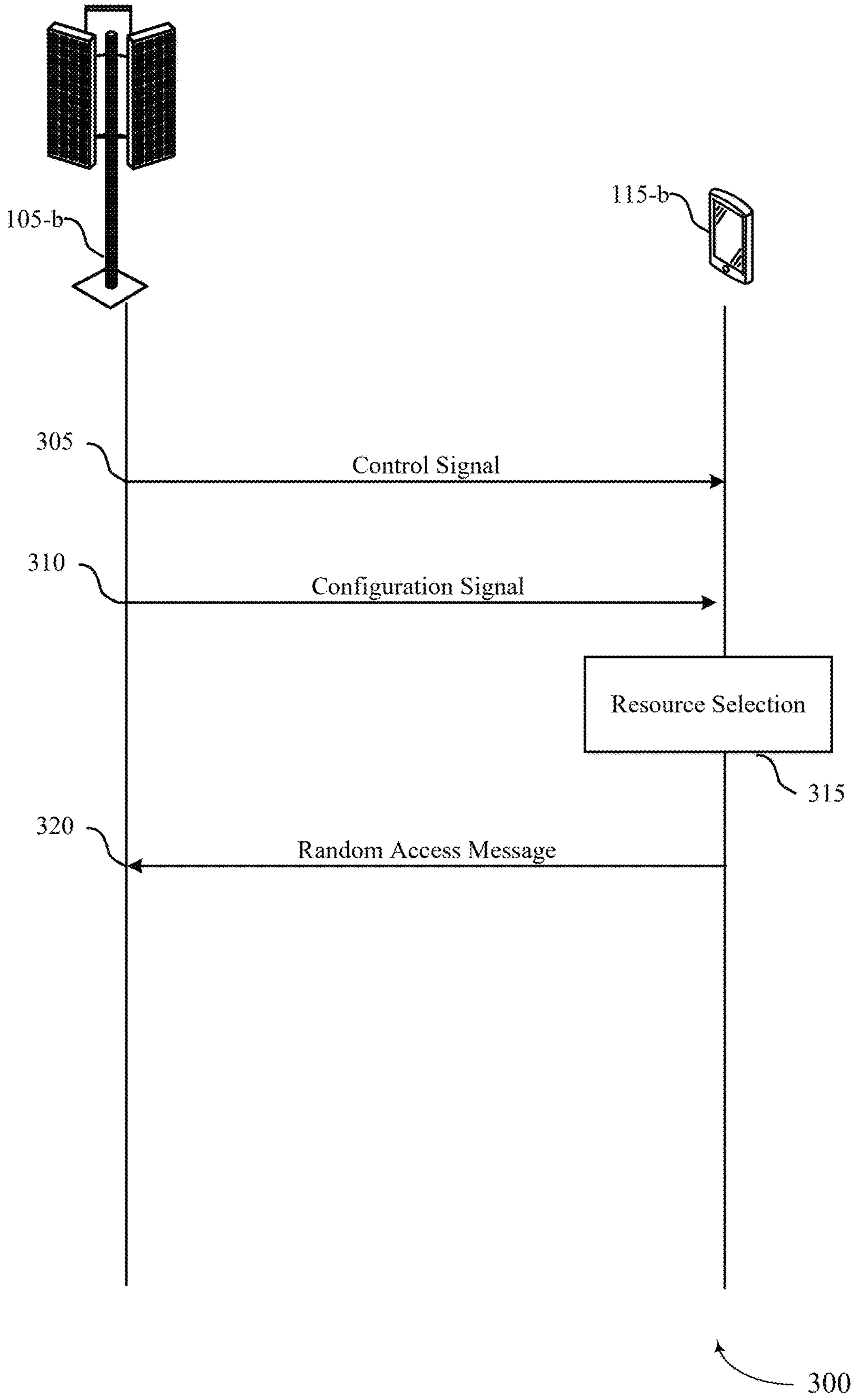
FIG. 3 shows an example of a process flow that supports techniques for communicating using subband full-duplex operation in accordance with one or more aspects of the present disclosure.

FIG. 3 shows an example of a process flow 300 that supports techniques for communicating using subband full-duplex operation in accordance with one or more aspects of the present disclosure. The process flow 300 includes a UE 115-*b* and a network entity 105-*b*, which may be examples of the corresponding devices as described with respect to FIGS. 1 and 2. In the following description of the process flow 300, the operations between the UE 115-*b* and the network entity 105-*b* may be performed in a different order than the example order shown. Some operations may also be omitted from the process flow 300, and other operations may be added to the process flow 300. Further, although some operations or signaling may be shown to occur at different times for discussion purposes, these operations may actually occur at the same time.

At 305, the UE 115-*b* may receive, from the network entity 105-*b*, a control signal including a random access configuration index, where the random access configuration index indicates a resource allocation pattern associated with random access occasions.

At 310, the UE 115-*b* may receive, from the network entity 105-*b*, a configuration message including a first set of configuration parameters for a random access message payload for one or more subband full duplex symbols and a second set of configuration parameters for a random access message payload for one or more non-subband full duplex symbols. In some cases, the one or more subband full duplex symbols may include a downlink symbol or a flexible symbol.

At 315, the UE 115-*b* may select one or more uplink resources from the random access occasions for transmitting a random access message based on a random access configuration table and the random access configuration index. In some examples, at least one of the uplink resources may include an uplink subband within a subband full duplex symbol, where the subband full duplex symbol includes a downlink symbol or a flexible symbol.

Additionally, or alternatively, the UE 115-*b* may select one or more uplink resources for transmitting a random access message based on the first set of configuration parameters and the second set of configuration parameters.

At 320, the UE 115-*b* may transmit the random access message using the one or more uplink resources.

Figure 4:
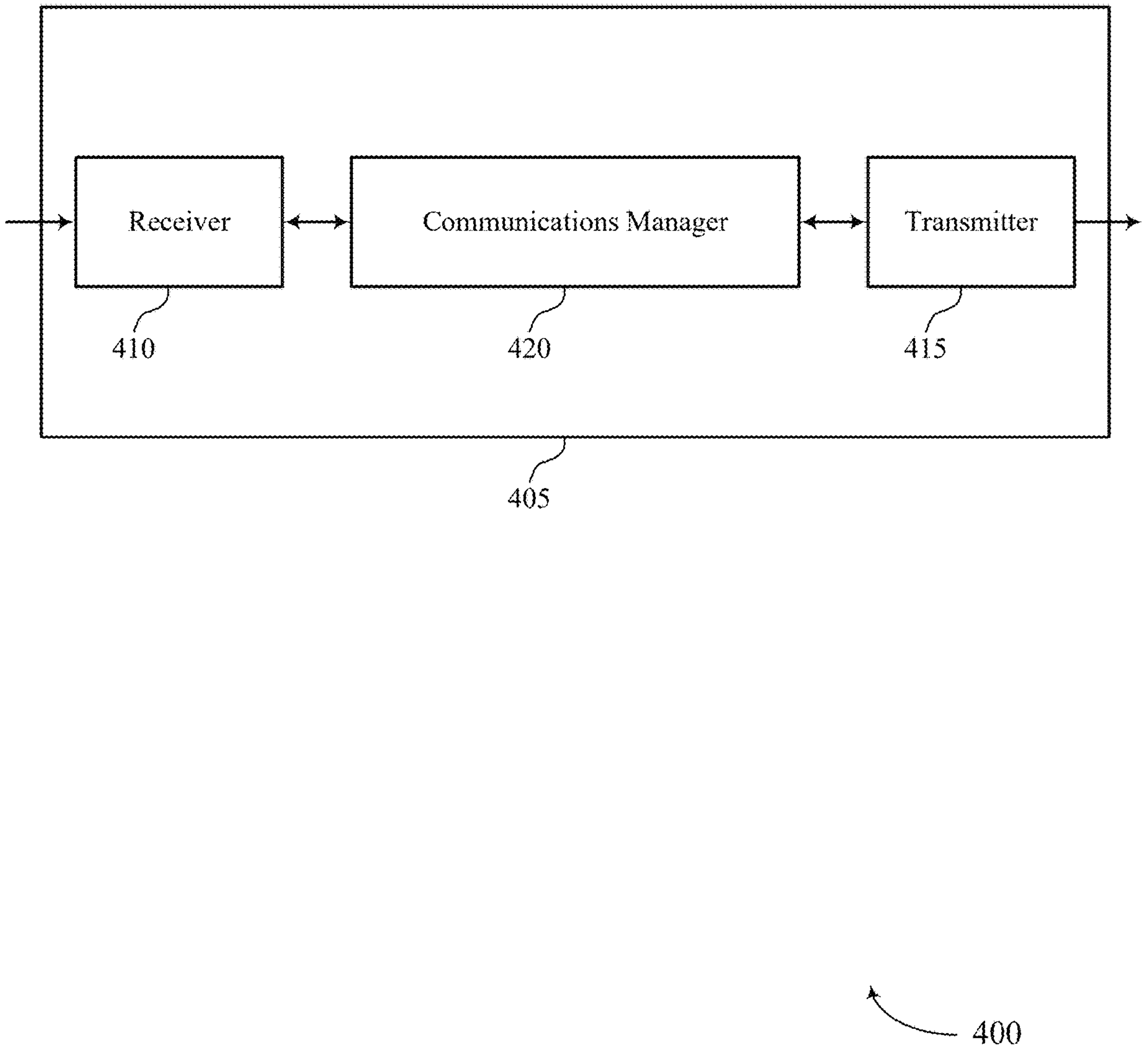
FIGS. 4 and 5 show block diagrams of devices that support techniques for communicating using subband full-duplex operation in accordance with one or more aspects of the present disclosure.

FIG. 4 shows a block diagram 400 of a device 405 that supports techniques for communicating using subband full-duplex operation in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for communicating using subband full-duplex operation). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for communicating using subband full-duplex operation). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations or components thereof may be examples of means for performing various aspects of techniques for communicating using subband full-duplex operation as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor (e.g., referred to as a processor-executable code). If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for receiving a control signal including a random access configuration index, where the random access configuration index indicates a resource allocation pattern associated with random access occasions. The communications manager 420 is capable of, configured to, or operable to support a means for selecting one or more uplink resources from the random access occasions for transmitting a random access message based on a random access configuration table and the random access configuration index, where at least one of the uplink resources includes an uplink subband within a subband full duplex symbol, where the subband full duplex symbol includes a downlink symbol or a flexible symbol. The communications manager 420 is capable of, configured to, or operable to support a means for transmitting the random access message using the one or more uplink resources.

Additionally, or alternatively, the communications manager 420 may support wireless communications in accordance with examples as disclosed herein. For example, the communications manager 420 is capable of, configured to, or operable to support a means for receiving a configuration message including a first set of configuration parameters for a random access message payload for one or more subband full duplex symbols and a second set of configuration parameters for a random access message payload for one or more non-subband full duplex symbols, where the one or more subband full duplex symbols includes a downlink symbol or a flexible symbol. The communications manager 420 is capable of, configured to, or operable to support a means for selecting one or more uplink resources for transmitting a random access message based on the first set of configuration parameters and the second set of configuration parameters. The communications manager 420 is capable of, configured to, or operable to support a means for transmitting the random access message using the one or more uplink resources.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for reduced processing, reduced power consumption, and more efficient utilization of communication resources.

Figure 5:
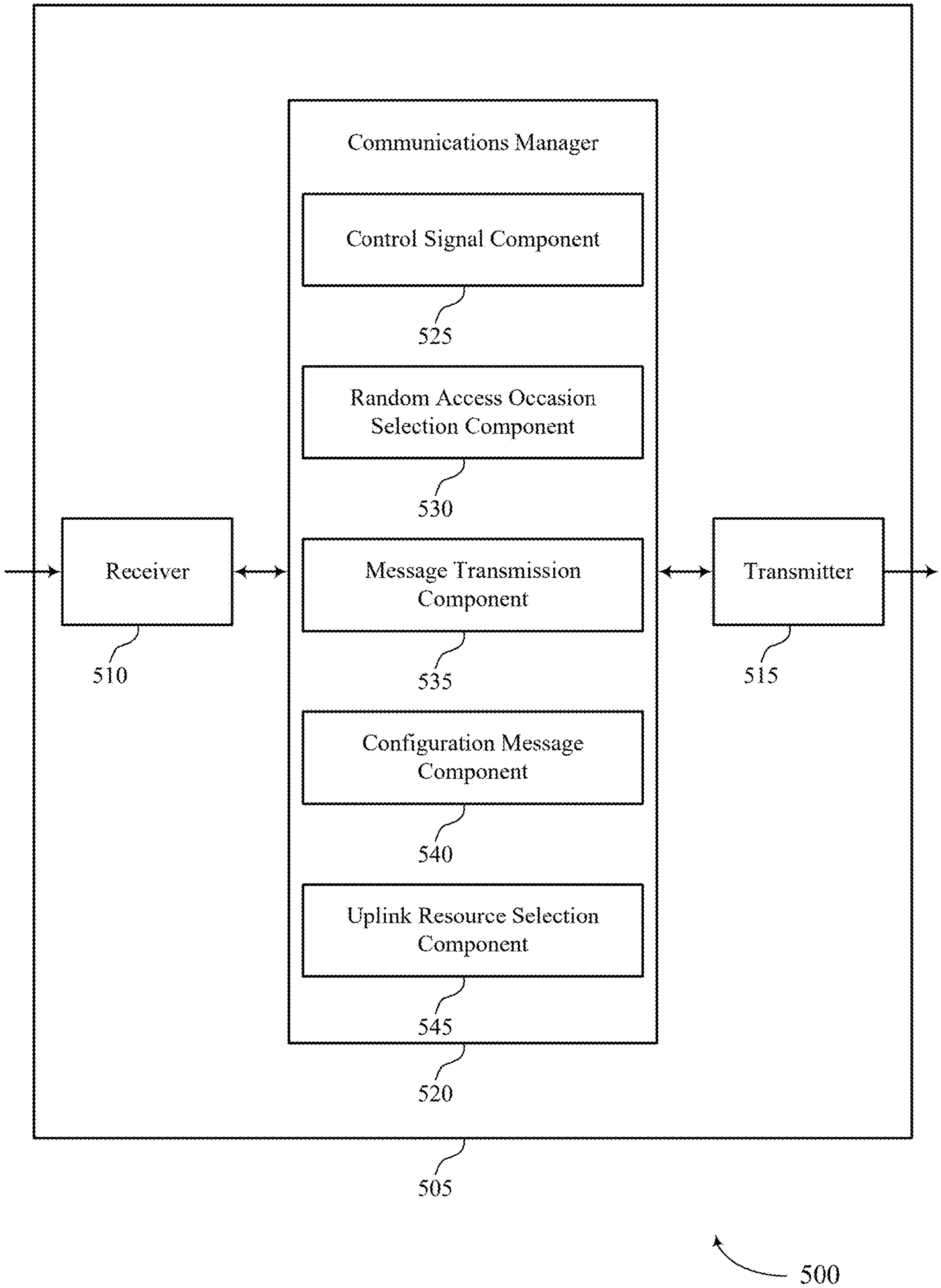

FIG. 5 shows a block diagram 500 of a device 505 that supports techniques for communicating using subband full-duplex operation in accordance with one or more aspects of the present disclosure. The device 505 may be an example of aspects of a device 405 or a UE 115 as described herein. The device 505 may include a receiver 510, a transmitter 515, and a communications manager 520. The device 505, or one of more components of the device 505 (e.g., the receiver 510, the transmitter 515, the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for communicating using subband full-duplex operation). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for communicating using subband full-duplex operation). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for communicating using subband full-duplex operation as described herein. For example, the communications manager 520 may include a control signal component 525, a random access occasion selection component 530, a message transmission component 535, a configuration message component 540, an uplink resource selection component 545, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The control signal component 525 is capable of, configured to, or operable to support a means for receiving a control signal including a random access configuration index, where the random access configuration index indicates a resource allocation pattern associated with random access occasions. The random access occasion selection component 530 is capable of, configured to, or operable to support a means for selecting one or more uplink resources from the random access occasions for transmitting a random access message based on a random access configuration table and the random access configuration index, where at least one of the uplink resources includes an uplink subband within a subband full duplex symbol, where the subband full duplex symbol includes a downlink symbol or a flexible symbol. The message transmission component 535 is capable of, configured to, or operable to support a means for transmitting the random access message using the one or more uplink resources.

Additionally, or alternatively, the communications manager 520 may support wireless communications in accordance with examples as disclosed herein. The configuration message component 540 is capable of, configured to, or operable to support a means for receiving a configuration message including a first set of configuration parameters for a random access message payload for one or more subband full duplex symbols and a second set of configuration parameters for a random access message payload for one or more non-subband full duplex symbols, where the one or more subband full duplex symbols includes a downlink symbol or a flexible symbol. The uplink resource selection component 545 is capable of, configured to, or operable to support a means for selecting one or more uplink resources for transmitting a random access message based on the first set of configuration parameters and the second set of configuration parameters. The message transmission component 535 is capable of, configured to, or operable to support a means for transmitting the random access message using the one or more uplink resources.

Figure 6:
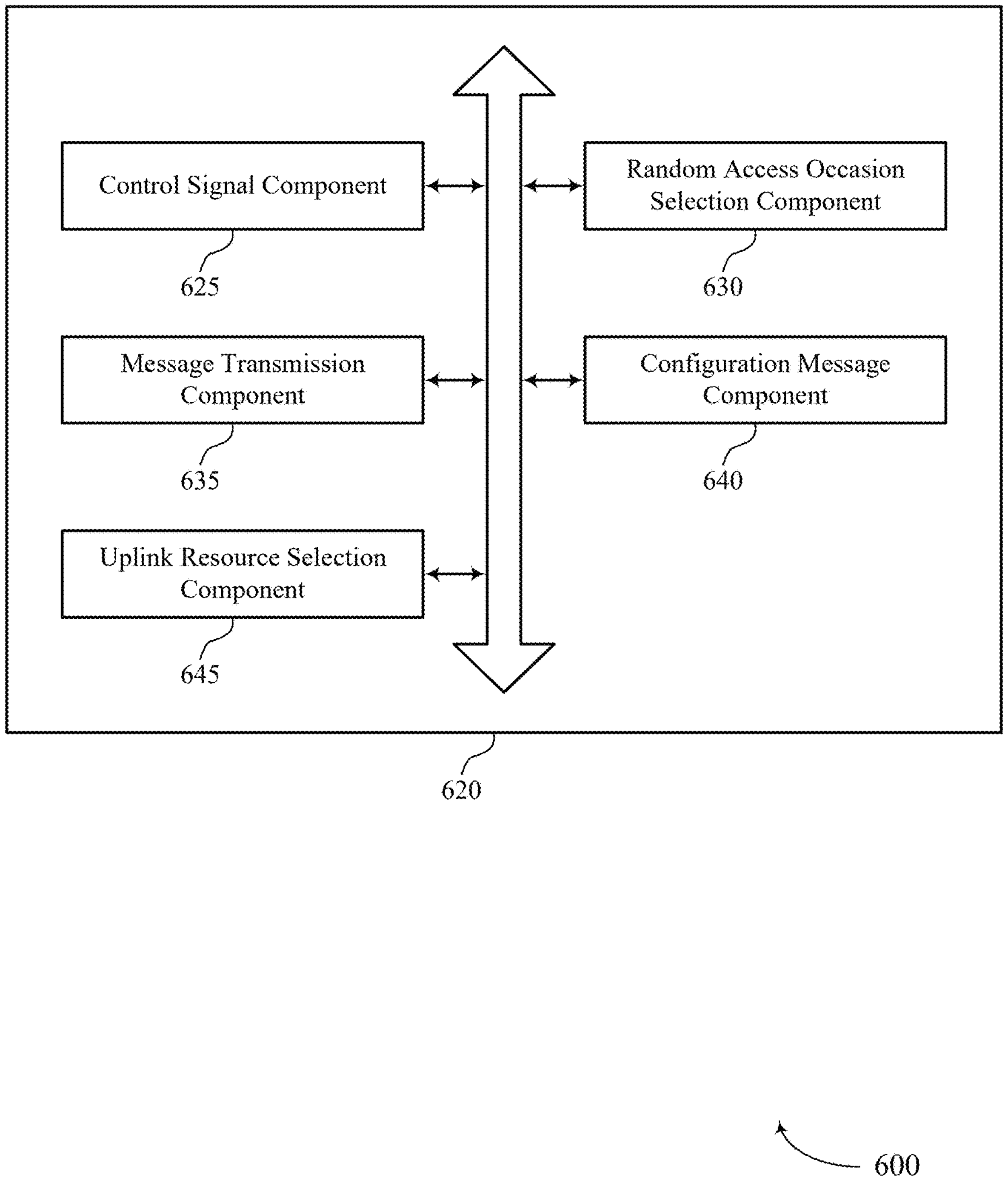
FIG. 6 shows a block diagram of a communications manager that supports techniques for communicating using subband full-duplex operation in accordance with one or more aspects of the present disclosure.

FIG. 6 shows a block diagram 600 of a communications manager 620 that supports techniques for communicating using subband full-duplex operation in accordance with one or more aspects of the present disclosure. The communications manager 620 may be an example of aspects of a communications manager 420, a communications manager 520, or both, as described herein. The communications manager 620, or various components thereof, may be an example of means for performing various aspects of techniques for communicating using subband full-duplex operation as described herein. For example, the communications manager 620 may include a control signal component 625, a random access occasion selection component 630, a message transmission component 635, a configuration message component 640, an uplink resource selection component 645, or any combination thereof. Each of these components, or components or subcomponents thereof (e.g., one or more processors, one or more memories), may communicate, directly or indirectly, with one another (e.g., via one or more buses).

The communications manager 620 may support wireless communications in accordance with examples as disclosed herein. The control signal component 625 is capable of, configured to, or operable to support a means for receiving a control signal including a random access configuration index, where the random access configuration index indicates a resource allocation pattern associated with random access occasions. The random access occasion selection component 630 is capable of, configured to, or operable to support a means for selecting one or more uplink resources from the random access occasions for transmitting a random access message based on a random access configuration table and the random access configuration index, where at least one of the uplink resources includes an uplink subband within a subband full duplex symbol, where the subband full duplex symbol includes a downlink symbol or a flexible symbol. The message transmission component 635 is capable of, configured to, or operable to support a means for transmitting the random access message using the one or more uplink resources.

In some examples, to support selecting the one or more uplink resources, the random access occasion selection component 630 is capable of, configured to, or operable to support a means for selecting the one or more uplink resources from a frequency division duplex table associated with a first frequency range.

In some examples, to support selecting the one or more uplink resources, the random access occasion selection component 630 is capable of, configured to, or operable to support a means for selecting the one or more uplink resources from a frequency division duplex table associated with a first frequency range. In some examples, to support selecting the one or more uplink resources, the random access occasion selection component 630 is capable of, configured to, or operable to support a means for selecting a second uplink resource of the one or more uplink resources from a time division duplex table associated with the first frequency range, where the second uplink resource includes an uplink slot.

In some examples, to support selecting the one or more uplink resources, the random access occasion selection component 630 is capable of, configured to, or operable to support a means for selecting the one or more uplink resources from one or more entries in a frequency division duplex table associated with a first frequency range, where the one or more entries are allocated to one or more random access occasions included in one or more subband full duplex symbols that are configured as the downlink symbol or the flexible symbol. In some examples, the one or more entries correspond to subframe numbers or slot numbers or both.

In some examples, to support receiving the control signal, the control signal component 625 is capable of, configured to, or operable to support a means for receiving the control signal including an indication of a location of one or more entries that are allocated to one or more random access occasions included in one or more subband full duplex symbols that are configured as a downlink symbol or a flexible symbol.

In some examples, the location corresponds to subframe numbers or slot numbers or both. In some examples, the indication of the location includes an indication of a time offset field. In some examples, the UE includes a half-duplex UE.

Additionally, or alternatively, the communications manager 620 may support wireless communications in accordance with examples as disclosed herein. The configuration message component 640 is capable of, configured to, or operable to support a means for receiving a configuration message including a first set of configuration parameters for a random access message payload for one or more subband full duplex symbols and a second set of configuration parameters for a random access message payload for one or more non-subband full duplex symbols, where the one or more subband full duplex symbols includes a downlink symbol or a flexible symbol. The uplink resource selection component 645 is capable of, configured to, or operable to support a means for selecting one or more uplink resources for transmitting a random access message based on the first set of configuration parameters and the second set of configuration parameters. In some examples, the message transmission component 635 is capable of, configured to, or operable to support a means for transmitting the random access message using the one or more uplink resources.

In some examples, to support selecting the one or more uplink resources, the uplink resource selection component 645 is capable of, configured to, or operable to support a means for selecting a first uplink resource of the one or more uplink resources based on applying a first frequency offset in accordance with the first set of configuration parameters. In some examples, to support selecting the one or more uplink resources, the uplink resource selection component 645 is capable of, configured to, or operable to support a means for selecting a second uplink resource associated with the one or more non-subband full duplex symbols based on applying a second frequency offset in accordance with the second set of configuration parameters, the second frequency offset being different from the first frequency offset.

In some examples, a quantity of physical resource blocks associated with a first uplink resource of the one or more uplink resources is less or more than a quantity of physical resource blocks associated with a second uplink resource associated with the one or more non-subband full duplex symbols.

In some examples, a quantity of symbols associated with a first uplink resource of the one or more uplink resources is greater or less than a quantity of symbols associated with a second uplink resource associated with the one or more non-subband full duplex symbols.

In some examples, to support selecting the one or more uplink resources, the uplink resource selection component 645 is capable of, configured to, or operable to support a means for selecting a first uplink resource of the one or more uplink resources based on applying a first time offset in accordance with the first set of configuration parameters. In some examples, to support selecting the one or more uplink resources, the uplink resource selection component 645 is capable of, configured to, or operable to support a means for selecting a second uplink resource associated with the one or more non-subband full duplex symbols based on applying a second time offset in accordance with the second set of configuration parameters, the second time offset being different from the first time offset.

In some examples, a frequency domain multiplexing parameter associated with a first uplink resource of the one or more uplink resources is different from a frequency domain multiplexing parameter associated with a second uplink resource associated with the one or more non-subband full duplex symbols.

Figure 7:
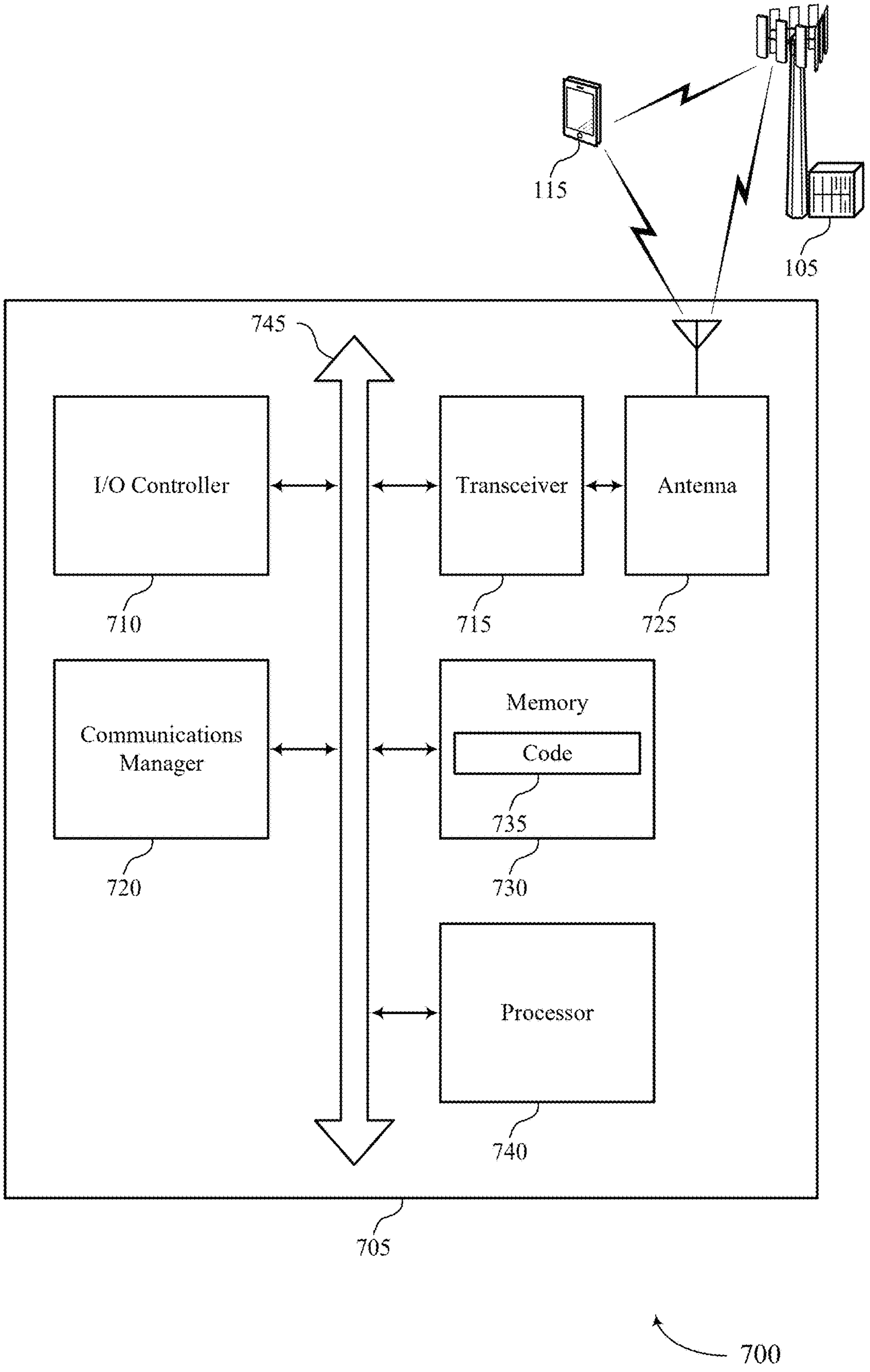
FIG. 7 shows a diagram of a system including a device that supports techniques for communicating using subband full-duplex operation in accordance with one or more aspects of the present disclosure.

FIG. 7 shows a diagram of a system 700 including a device 705 that supports techniques for communicating using subband full-duplex operation in accordance with one or more aspects of the present disclosure. The device 705 may be an example of or include components of a device 405, a device 505, or a UE 115 as described herein. The device 705 may communicate (e.g., wirelessly) with one or more other devices (e.g., network entities 105, UEs 115, or a combination thereof). The device 705 may include components for bi-directional voice and data communications including components for transmitting and receiving communications, such as a communications manager 720, an input/output (I/O) controller, such as an I/O controller 710, a transceiver 715, one or more antennas 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna. However, in some other cases, the device 705 may have more than one antenna, which may be capable of concurrently transmitting or receiving multiple wireless transmissions. The transceiver 715 may communicate bi-directionally via the one or more antennas 725 using wired or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable, or processor-executable code, such as the code 735. The code 735 may include instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may include, among other things, a basic I/O system (BIOS) which may control basic hardware or software operation such as the interaction with peripheral components or devices.

The at least one processor 740 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730)

to cause the device 705 to perform various functions (e.g., functions or tasks supporting techniques for communicating using subband full-duplex operation). For example, the device 705 or a component of the device 705 may include at least one processor 740 and at least one memory 730 coupled with or to the at least one processor 740, the at least one processor 740 and the at least one memory 730 configured to perform various functions described herein.

In some examples, the at least one processor 740 may include multiple processors and the at least one memory 730 may include multiple memories. One or more of the multiple processors may be coupled with one or more of the multiple memories, which may, individually or collectively, be configured to perform various functions described herein. In some examples, the at least one processor 740 may be a component of a processing system, which may refer to a system (such as a series) of machines, circuitry (including, for example, one or both of processor circuitry (which may include the at least one processor 740) and memory circuitry (which may include the at least one memory 730)), or components, that receives or obtains inputs and processes the inputs to produce, generate, or obtain a set of outputs. The processing system may be configured to perform one or more of the functions described herein. For example, the at least one processor 740 or a processing system including the at least one processor 740 may be configured to, configurable to, or operable to cause the device 705 to perform one or more of the functions described herein. Further, as described herein, being "configured to," being "configurable to," and being "operable to" may be used interchangeably and may be associated with a capability, when executing code 735 (e.g., processor-executable code) stored in the at least one memory 730 or otherwise, to perform one or more of the functions described herein.

The communications manager 720 may support wireless communications in accordance with examples as disclosed herein. For example, the communications manager 720 is capable of, configured to, or operable to support a means for receiving a control signal including a random access configuration index, where the random access configuration index indicates a resource allocation pattern associated with random access occasions. The communications manager 720 is capable of, configured to, or operable to support a means for selecting one or more uplink resources from the random access occasions for transmitting a random access message based on a random access configuration table and the random access configuration index, where at least one of the uplink resources includes an uplink subband within a subband full duplex symbol, where the subband full duplex symbol includes a downlink symbol or a flexible symbol. The communications manager 720 is capable of, configured to, or operable to support a means for transmitting the random access message using the one or more uplink resources.

Additionally, or alternatively, the communications manager 720 may support wireless communications in accordance with examples as disclosed herein. For example, the communications manager 720 is capable of, configured to, or operable to support a means for receiving a configuration message including a first set of configuration parameters for a random access message payload for one or more subband full duplex symbols and a second set of configuration parameters for a random access message payload for one or more non-subband full duplex symbols, where the one or more subband full duplex symbols includes a downlink symbol or a flexible symbol. The communications manager 720 is capable of, configured to, or operable to support a means for selecting one or more uplink resources for transmitting a random access message based on the first set of configuration parameters and the second set of configuration parameters. The communications manager 720 is capable of, configured to, or operable to support a means for transmitting the random access message using the one or more uplink resources.

By including or configuring the communications manager 720 in accordance with examples as described herein, the device 705 may support techniques for improved communication reliability, reduced latency, improved user experience related to reduced processing, reduced power consumption, more efficient utilization of communication resources, improved coordination between devices, and improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of techniques for communicating using subband full-duplex operation as described herein, or the at least one processor 740 and the at least one memory 730 may be otherwise configured to, individually or collectively, perform or support such operations.

Figure 8:
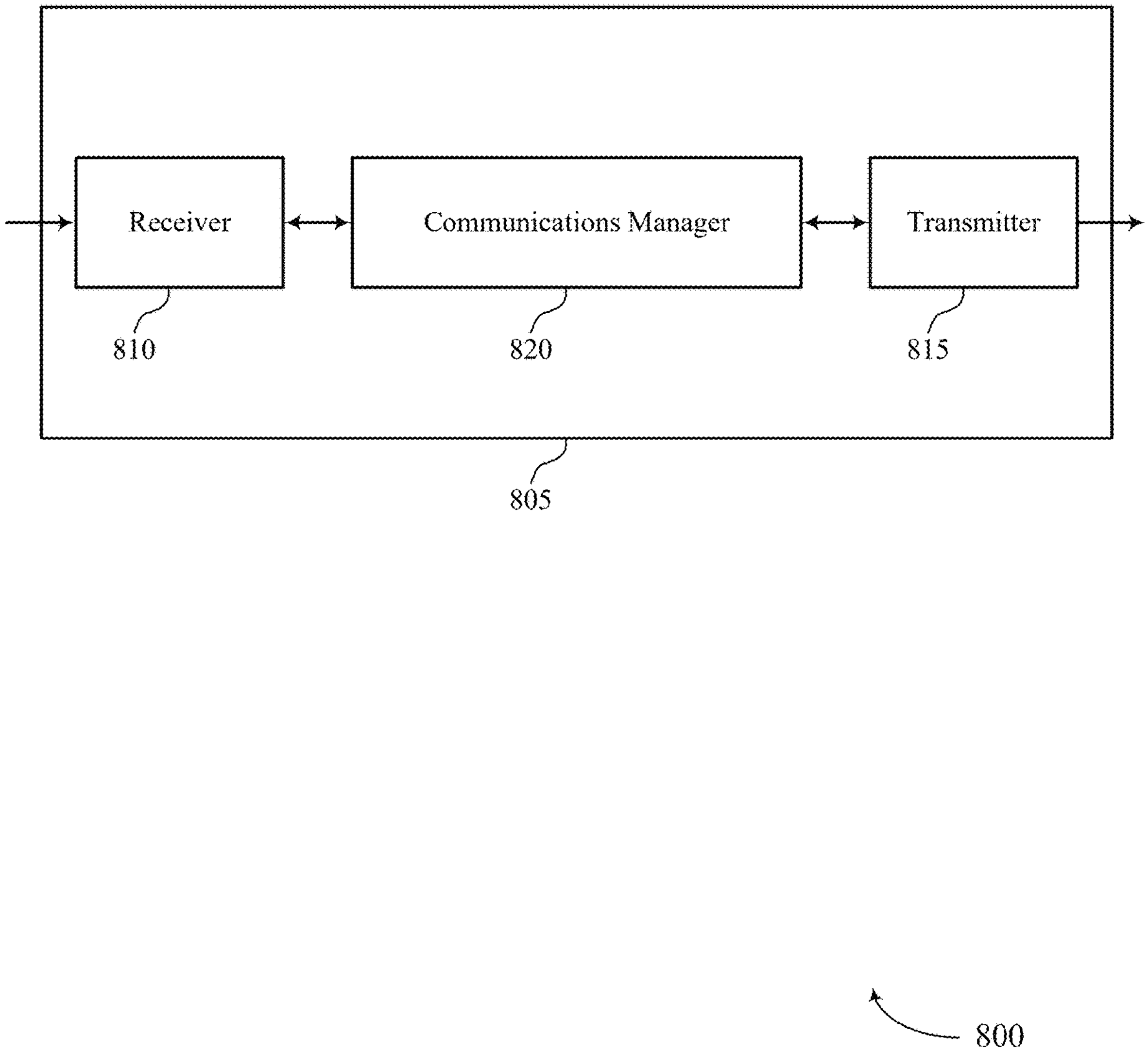
FIGS. 8 and 9 show block diagrams of devices that support techniques for communicating using subband full-duplex operation in accordance with one or more aspects of the present disclosure.

FIG. 8 shows a block diagram 800 of a device 805 that supports techniques for communicating using subband full-duplex operation in accordance with one or more aspects of the present disclosure. The device 805 may be an example of aspects of a network entity 105 as described herein. The device 805 may include a receiver 810, a transmitter 815, and a communications manager 820. The device 805, or one or more components of the device 805 (e.g., the receiver 810, the transmitter 815, the communications manager 820), may include at least one processor, which may be coupled with at least one memory, to, individually or collectively, support or enable the described techniques. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations or components thereof may be examples of means for performing various aspects of techniques for communicating using subband full-duplex operation as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor (e.g., referred to as a processor-executable code). If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for transmitting, to a UE, a control signal including a random access configuration index, where the random access configuration index indicates a resource allocation pattern associated with random access occasions. The communications manager 820 is capable of, configured to, or operable to support a means for receiving a random access message using one or more uplink resources, where the one or more uplink resources are selected from the random access occasions based on a random access configuration table and the random access configuration index, and where at least one of the uplink resources includes an uplink subband within a subband full duplex symbol, where the subband full duplex symbol includes a downlink symbol or a flexible symbol.

Additionally, or alternatively, the communications manager 820 may support wireless communications in accordance with examples as disclosed herein. For example, the communications manager 820 is capable of, configured to, or operable to support a means for transmitting a configuration message including a first set of configuration parameters for a random access message payload for one or more subband full duplex symbols and a second set of configuration parameters for a random access message payload for one or more non-subband full duplex symbols, where the one or more subband full duplex symbols includes a downlink symbol or a flexible symbol. The communications manager 820 is capable of, configured to, or operable to support a means for receiving a random access message using one or more uplink resources, where the one or more uplink resources are selected based on the first set of configuration parameters and the second set of configuration parameters.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for reduced processing, reduced power consumption, and more efficient utilization of communication resources.

Figure 9:
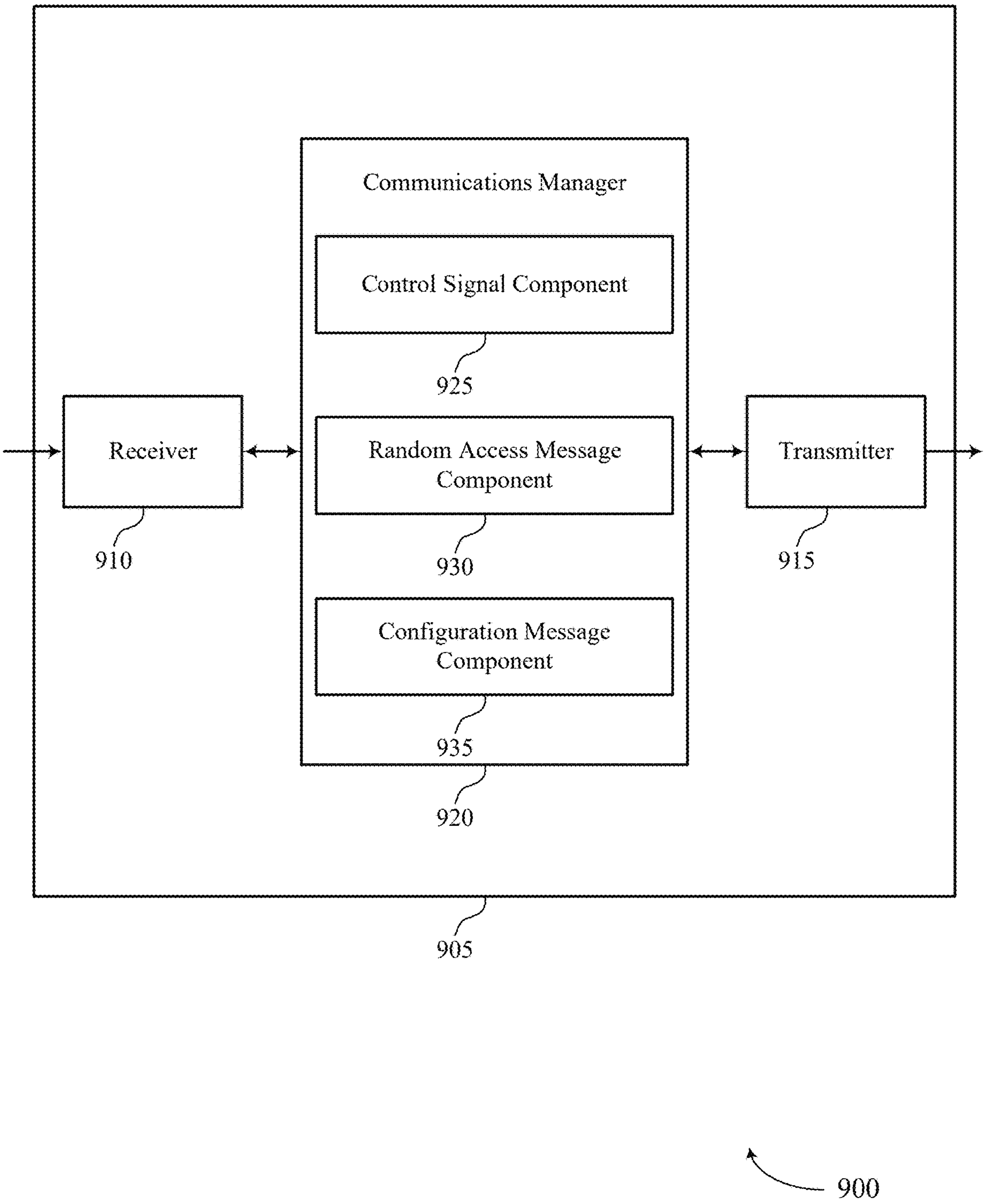

FIG. 9 shows a block diagram 900 of a device 905 that supports techniques for communicating using subband full-duplex operation in accordance with one or more aspects of the present disclosure. The device 905 may be an example of aspects of a device 805 or a network entity 105 as described herein. The device 905 may include a receiver 910, a transmitter 915, and a communications manager 920. The device 905, or one of more components of the device 905 (e.g., the receiver 910, the transmitter 915, the communications manager 920), may include at least one processor, which may be coupled with at least one memory, to support the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of techniques for communicating using subband full-duplex operation as described herein. For example, the communications manager 920 may include a control signal component 925, a random access message component 930, a configuration message component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The control signal component 925 is capable of, configured to, or operable to support a means for transmitting, to a UE, a control signal including a random access configuration index, where the random access configuration index indicates a resource allocation pattern associated with random access occasions. The random access message component 930 is capable of, configured to, or operable to support a means for receiving a random access message using one or more uplink resources, where the one or more uplink resources are selected from the random access occasions based on a random access configuration table and the random access configuration index, and where at least one of the uplink resources includes an uplink subband within a subband full duplex symbol, where the subband full duplex symbol includes a downlink symbol or a flexible symbol.

Additionally, or alternatively, the communications manager 920 may support wireless communications in accordance with examples as disclosed herein. The configuration message component 935 is capable of, configured to, or operable to support a means for transmitting a configuration message including a first set of configuration parameters for a random access message payload for one or more subband full duplex symbols and a second set of configuration parameters for a random access message payload for one or more non-subband full duplex symbols, where the one or more subband full duplex symbols includes a downlink symbol or a flexible symbol. The random access message component 930 is capable of, configured to, or operable to support a means for receiving a random access message using one or more uplink resources, where the one or more uplink resources are selected based on the first set of configuration parameters and the second set of configuration parameters.

Figure 10:
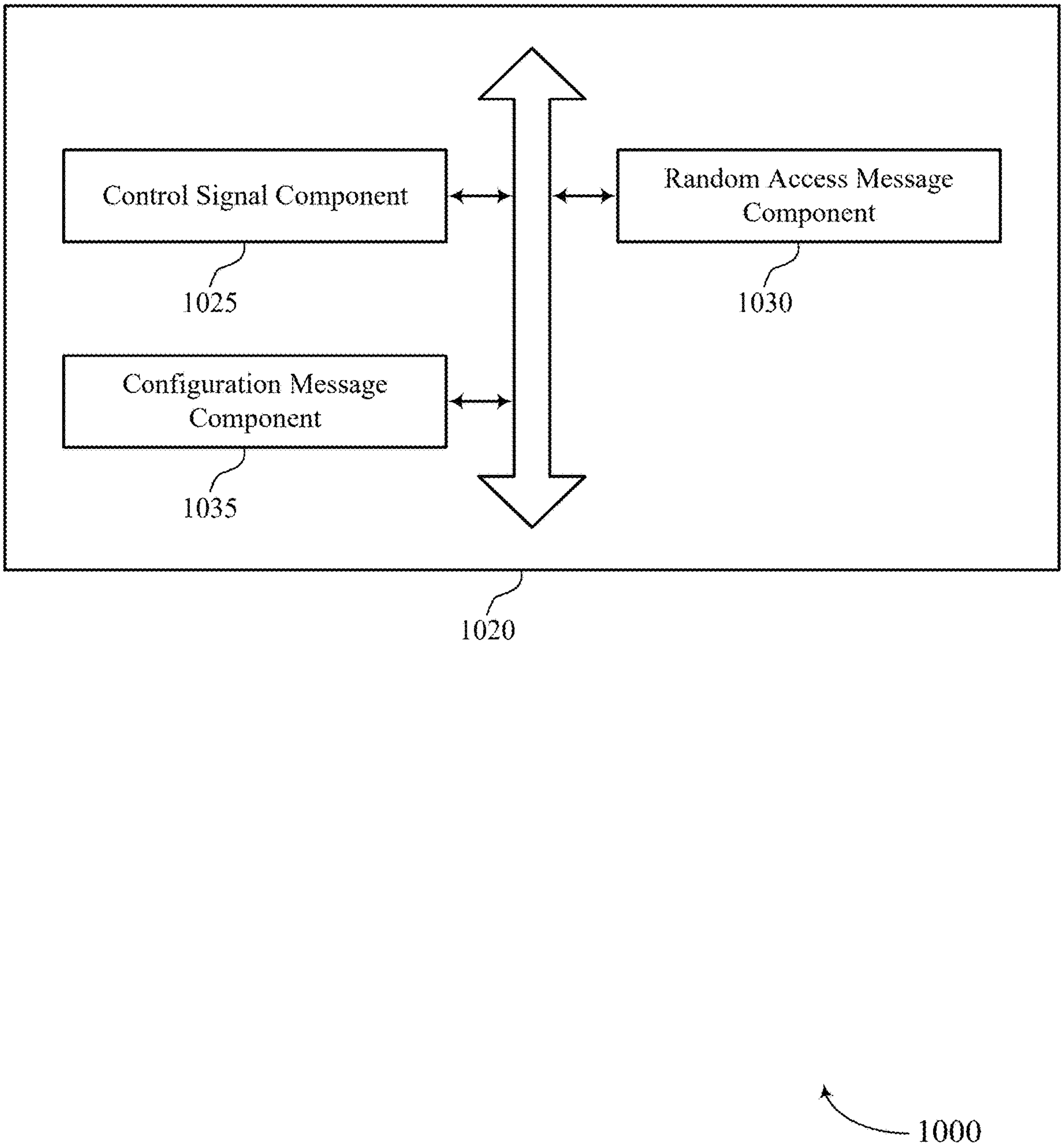
FIG. 10 shows a block diagram of a communications manager that supports techniques for communicating using subband full-duplex operation in accordance with one or more aspects of the present disclosure.

FIG. 10 shows a block diagram 1000 of a communications manager 1020 that supports techniques for communicating using subband full-duplex operation in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of techniques for communicating using subband full-duplex operation as described herein. For example, the communications manager 1020 may include a control signal component 1025, a random access message component 1030, a configuration message component 1035, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications in accordance with examples as disclosed herein. The control signal component 1025 is capable of, configured to, or operable to support a means for transmitting, to a UE, a control signal including a random access configuration index, where the random access configuration index indicates a resource allocation pattern associated with random access occasions. The random access message component 1030 is capable of, configured to, or operable to support a means for receiving a random access message using one or more uplink resources, where the one or more uplink resources are selected from the random access occasions based on a random access configuration table and the random access configuration index, and where at least one of the uplink resources includes an uplink subband within a subband full duplex symbol, where the subband full duplex symbol includes a downlink symbol or a flexible symbol.

In some examples, the one or more uplink resources from a frequency division duplex table associated with a first frequency range. In some examples, the one or more uplink resources are selected from a frequency division duplex table associated with a first frequency range. In some examples, a second uplink resource of the one or more uplink resources are selected from a time division duplex table associated with the first frequency range. In some examples, the second uplink resource includes an uplink slot.

In some examples, the one or more uplink resources are selected from one or more entries in a frequency division duplex table associated with a first frequency range. In some examples, the one or more entries are allocated to one or more random access occasions included in one or more subband full duplex symbols that are configured as the downlink symbol or the flexible symbol. In some examples, the one or more entries correspond to subframe numbers or slot numbers or both.

In some examples, to support transmitting the control signal, the control signal component 1025 is capable of, configured to, or operable to support a means for transmitting the control signal including an indication of a location of one or more entries that are allocated to one or more random access occasions included in one or more subband full duplex symbols that are configured as a downlink symbol or a flexible symbol.

In some examples, the location corresponds to subframe numbers or slot numbers or both. In some examples, the indication of the location includes an indication of a time offset field. In some examples, the UE includes a half-duplex UE.

Additionally, or alternatively, the communications manager 1020 may support wireless communications in accordance with examples as disclosed herein. The configuration message component 1035 is capable of, configured to, or operable to support a means for transmitting a configuration message including a first set of configuration parameters for a random access message payload for one or more subband full duplex symbols and a second set of configuration parameters for a random access message payload for one or more non-subband full duplex symbols, where the one or more subband full duplex symbols includes a downlink symbol or a flexible symbol. In some examples, the random access message component 1030 is capable of, configured to, or operable to support a means for receiving a random access message using one or more uplink resources, where the one or more uplink resources are selected based on the first set of configuration parameters and the second set of configuration parameters.

In some examples, a first uplink resource of the one or more uplink resources is selected based on applying a first frequency offset in accordance with the first set of configuration parameters. In some examples, a second uplink resource associated with the one or more non-subband full duplex symbols are selected based on applying a second frequency offset in accordance with the second set of configuration parameters, the second frequency offset being different from the first frequency offset.

In some examples, a quantity of physical resource blocks associated with a first uplink resource of the one or more uplink resources is less or more than a quantity of physical resource blocks associated with a second uplink resource associated with the one or more non-subband full duplex symbols.

In some examples, a quantity of symbols associated with a first uplink resource of the one or more uplink resources is greater or less than a quantity of symbols associated with a second uplink resource associated with the one or more non-subband full duplex symbols.

In some examples, a first uplink resource of the one or more uplink resources is selected based on applying a first time offset in accordance with the first set of configuration parameters. In some examples, a second uplink resource associated with the one or more non-subband full duplex symbols is selected based on applying a second time offset in accordance with the second set of configuration parameters, the second time offset being different from the first time offset.

In some examples, a frequency domain multiplexing parameter associated with a first uplink resource of the one or more uplink resources is different from a frequency domain multiplexing parameter associated with a second uplink resource associated with the one or more non-subband full duplex symbols.

Figure 11:
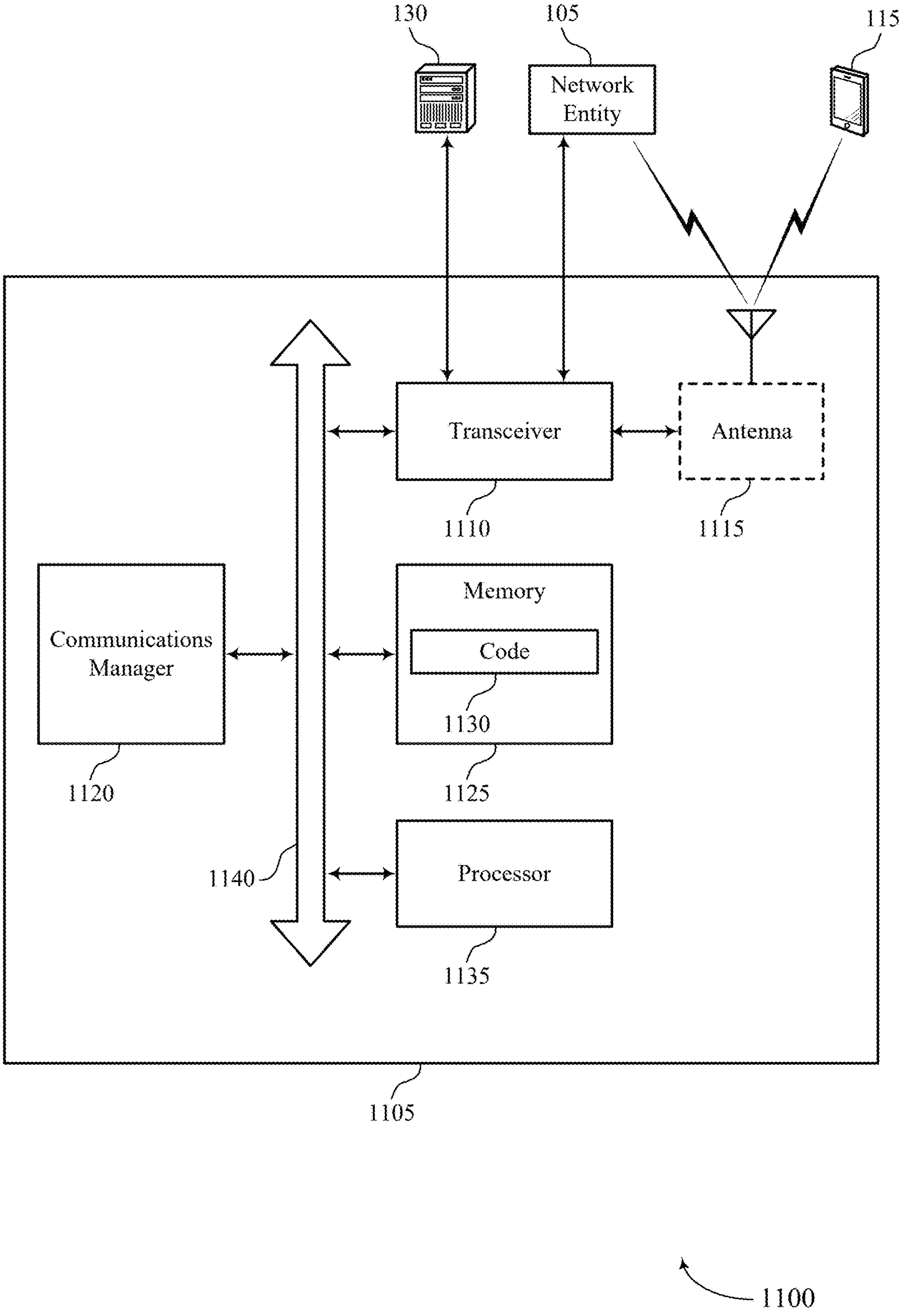
FIG. 11 shows a diagram of a system including a device that supports techniques for communicating using subband full-duplex operation in accordance with one or more aspects of the present disclosure.

FIG. 11 shows a diagram of a system 1100 including a device 1105 that supports techniques for communicating using subband full-duplex operation in accordance with one or more aspects of the present disclosure. The device 1105 may be an example of or include components of a device 805, a device 905, or a network entity 105 as described herein. The device 1105 may communicate with other network devices or network equipment such as one or more of the network entities 105, UEs 115, or any combination thereof. The communications may include communications over one or more wired interfaces, over one or more wireless interfaces, or any combination thereof. The device 1105 may include components that support outputting and obtaining communications, such as a communications manager 1120, a transceiver 1110, one or more antennas 1115, at least one memory 1125, code 1130, and at least one processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or one or more memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or one or more memory components (e.g., the at least one processor 1135, the at least one memory 1125, or both), may be included in a chip or chip assembly that is installed in the device 1105. In some examples, the transceiver 1110 may be operable to support communications via one or more communications links (e.g., communication link(s) 125, backhaul communication link(s) 120, a midhaul communication link 162, a fronthaul communication link 168).

The at least one memory 1125 may include RAM, ROM, or any combination thereof. The at least one memory 1125 may store computer-readable, computer-executable, or processor-executable code, such as the code 1130. The code 1130 may include instructions that, when executed by one or more of the at least one processor 1135, cause the device 1105 to perform various functions described herein. The code 1130 may be stored in a non-transitory computer-readable medium such as system memory or another type of memory. In some cases, the code 1130 may not be directly executable by a processor of the at least one processor 1135 but may cause a computer (e.g., when compiled and executed) to perform functions described herein. In some cases, the at least one memory 1125 may include, among other things, a BIOS which may control basic hardware or software operation such as the interaction with peripheral components or devices. In some examples, the at least one processor 1135 may include multiple processors and the at least one memory 1125 may include multiple memories. One or more of the multiple processors may be coupled with one or more of the multiple memories which may, individually or collectively, be configured to perform various functions herein (for example, as part of a processing system).

The at least one processor 1135 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1135 may be configured to operate a memory array using a memory controller. In some other cases, a memory controller may be integrated into one or more of the at least one processor 1135. The at least one processor 1135 may be configured to execute computer-readable instructions stored in a memory (e.g., one or more of the at least one memory 1125) to cause the device 1105 to perform various functions (e.g., functions or tasks supporting techniques for communicating using subband full-duplex operation). For example, the device 1105 or a component of the device 1105 may include at least one processor 1135 and at least one memory 1125 coupled with one or more of the at least one processor 1135, the at least one processor 1135 and the at least one memory 1125 configured to perform various functions described herein. The at least one processor 1135 may be an example of a cloud-computing platform (e.g., one or more physical nodes and supporting software such as operating systems, virtual machines, or container instances) that may host the functions (e.g., by executing code 1130) to perform the functions of the device 1105. The at least one processor 1135 may be any one or more suitable processors capable of executing scripts or instructions of one or more software programs stored in the device 1105 (such as within one or more of the at least one memory 1125).

In some examples, the at least one processor 1135 may include multiple processors and the at least one memory 1125 may include multiple memories. One or more of the multiple processors may be coupled with one or more of the multiple memories, which may, individually or collectively, be configured to perform various functions herein. In some examples, the at least one processor 1135 may be a component of a processing system, which may refer to a system (such as a series) of machines, circuitry (including, for example, one or both of processor circuitry (which may include the at least one processor 1135) and memory circuitry (which may include the at least one memory 1125)), or components, that receives or obtains inputs and processes the inputs to produce, generate, or obtain a set of outputs. The processing system may be configured to perform one or more of the functions described herein. For example, the at least one processor 1135 or a processing system including the at least one processor 1135 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1125 or otherwise, to perform one or more of the functions described herein.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the at least one memory 1125, the code 1130, and the at least one processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with one or more other network entities 105, and may include a controller or scheduler for controlling communications with UEs 115 (e.g., in cooperation with the one or more other network devices). In some examples, the communications manager 1120 may support an X2 interface within an LTE/LTE-A wireless communications network technology to provide communication between network entities 105.

The communications manager 1120 may support wireless communications in accordance with examples as disclosed herein. For example, the communications manager 1120 is capable of, configured to, or operable to support a means for transmitting, to a UE, a control signal including a random access configuration index, where the random access configuration index indicates a resource allocation pattern associated with random access occasions. The communications manager 1120 is capable of, configured to, or operable to support a means for receiving a random access message using one or more uplink resources, where the one or more uplink resources are selected from the random access occasions based on a random access configuration table and the random access configuration index, and where at least one of the uplink resources includes an uplink subband within a subband full duplex symbol, where the subband full duplex symbol includes a downlink symbol or a flexible symbol.

Additionally, or alternatively, the communications manager 1120 may support wireless communications in accordance with examples as disclosed herein. For example, the communications manager 1120 is capable of, configured to, or operable to support a means for transmitting a configuration message including a first set of configuration parameters for a random access message payload for one or more subband full duplex symbols and a second set of configuration parameters for a random access message payload for one or more non-subband full duplex symbols, where the one or more subband full duplex symbols includes a downlink symbol or a flexible symbol. The communications manager 1120 is capable of, configured to, or operable to support a means for receiving a random access message using one or more uplink resources, where the one or more uplink resources are selected based on the first set of configuration parameters and the second set of configuration parameters.

By including or configuring the communications manager 1120 in accordance with examples as described herein, the device 1105 may support techniques for improved communication reliability, reduced latency, improved user experience related to reduced processing, reduced power consumption, more efficient utilization of communication resources, improved coordination between devices, and improved utilization of processing capability.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, one or more of the at least one processor 1135, one or more of the at least one memory 1125, the code 1130, or any combination thereof (for example, by a processing system including at least a portion of the at least one processor 1135, the at least one memory 1125, the code 1130, or any combination thereof). For example, the code 1130 may include instructions executable by one or more of the at least one processor 1135 to cause the device 1105 to perform various aspects of techniques for communicating using subband full-duplex operation as described herein, or the at least one processor 1135 and the at least one memory 1125 may be otherwise configured to, individually or collectively, perform or support such operations.

Figure 12:
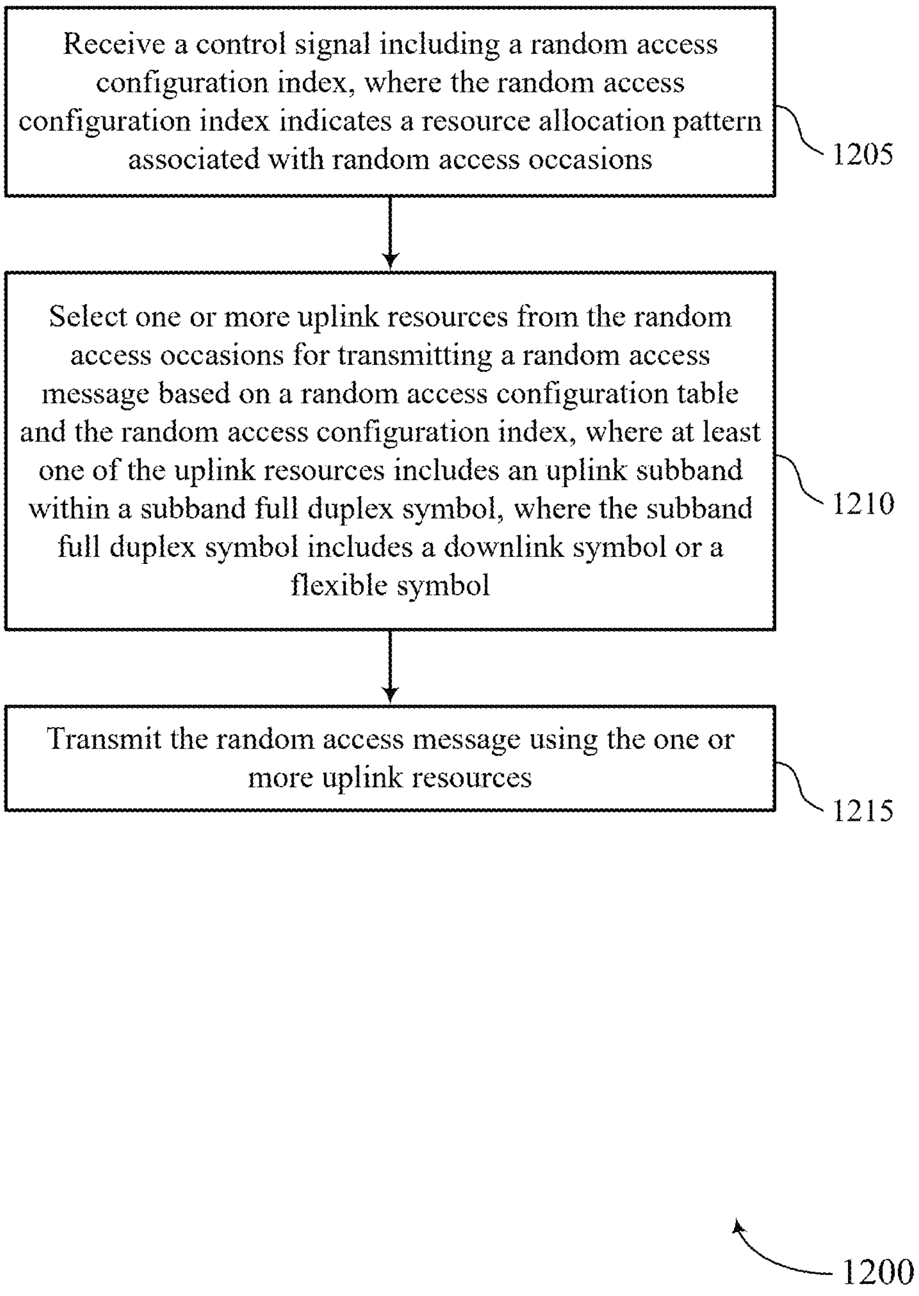
FIGS. 12 through 15 show flowcharts illustrating methods that support techniques for communicating using subband full-duplex operation in accordance with one or more aspects of the present disclosure.

FIG. 12 shows a flowchart illustrating a method 1200 that supports techniques for communicating using subband full-duplex operation in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving a control signal including a random access configuration index, where the random access configuration index indicates a resource allocation pattern associated with random access occasions. The operations of 1205 may be performed in accordance with examples as disclosed herein. In some examples, aspects of the operations of 1205 may be performed by a control signal component 625 as described with reference to FIG. 6.

At 1210, the method may include selecting one or more uplink resources from the random access occasions for transmitting a random access message based on a random access configuration table and the random access configuration index, where at least one of the uplink resources includes an uplink subband within a subband full duplex symbol, where the subband full duplex symbol includes a downlink symbol or a flexible symbol. The operations of 1210 may be performed in accordance with examples as disclosed herein. In some examples, aspects of the operations of 1210 may be performed by a random access occasion selection component 630 as described with reference to FIG. 6.

At 1215, the method may include transmitting the random access message using the one or more uplink resources. The operations of 1215 may be performed in accordance with examples as disclosed herein. In some examples, aspects of the operations of 1215 may be performed by a message transmission component 635 as described with reference to FIG. 6.

Figure 13:
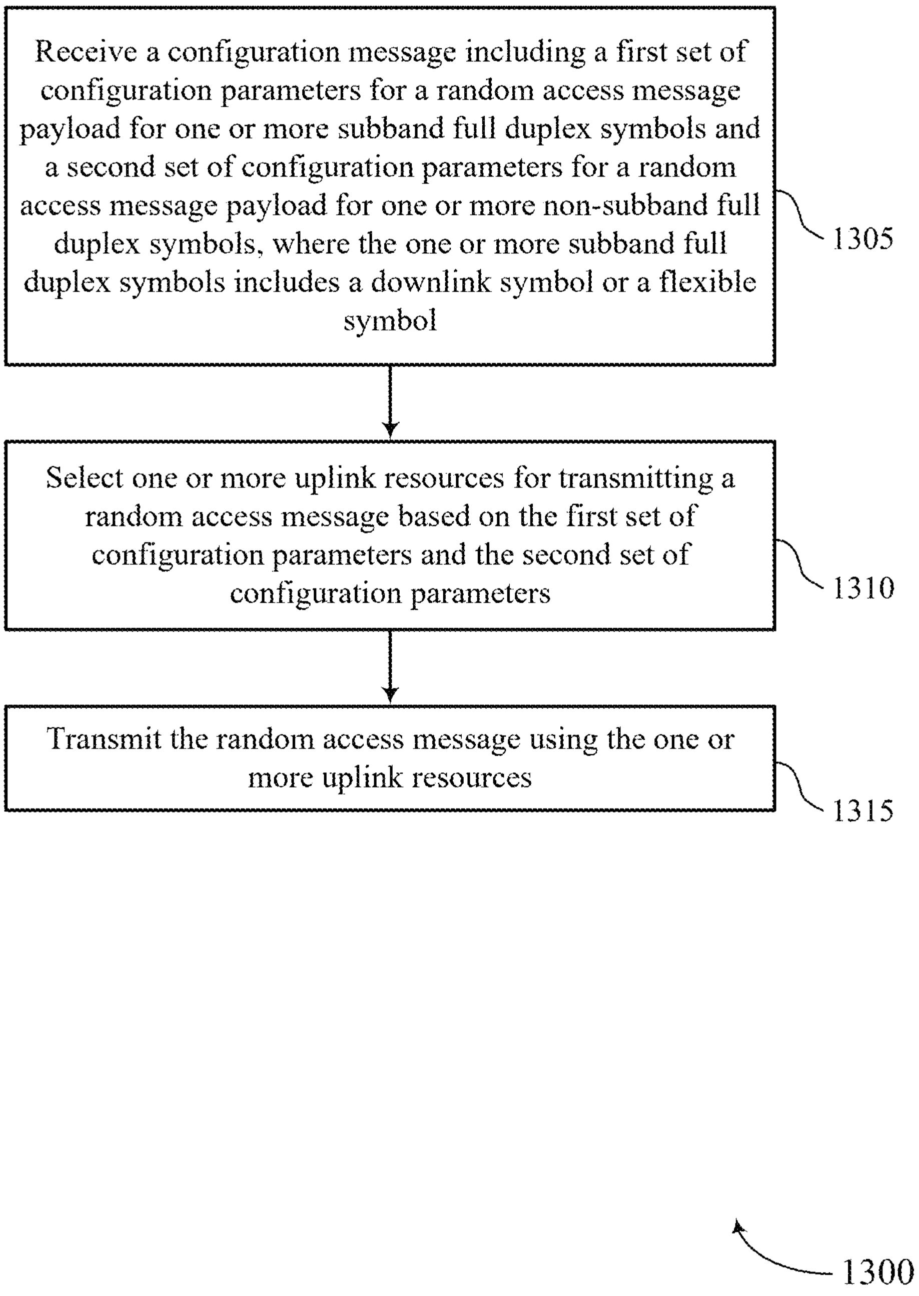

FIG. 13 shows a flowchart illustrating a method 1300 that supports techniques for communicating using subband full-duplex operation in accordance with one or more aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include receiving a configuration message including a first set of configuration parameters for a random access message payload for one or more subband full duplex symbols and a second set of configuration parameters for a random access message payload for one or more non-subband full duplex symbols, where the one or more subband full duplex symbols includes a downlink symbol or a flexible symbol. The operations of 1305 may be performed in accordance with examples as disclosed herein. In some examples, aspects of the operations of 1305 may be performed by a configuration message component 640 as described with reference to FIG. 6.

At 1310, the method may include selecting one or more uplink resources for transmitting a random access message based on the first set of configuration parameters and the second set of configuration parameters. The operations of 1310 may be performed in accordance with examples as disclosed herein. In some examples, aspects of the operations of 1310 may be performed by an uplink resource selection component 645 as described with reference to FIG. 6.

At 1315, the method may include transmitting the random access message using the one or more uplink resources. The operations of 1315 may be performed in accordance with examples as disclosed herein. In some examples, aspects of the operations of 1315 may be performed by a message transmission component 635 as described with reference to FIG. 6.

Figure 14:
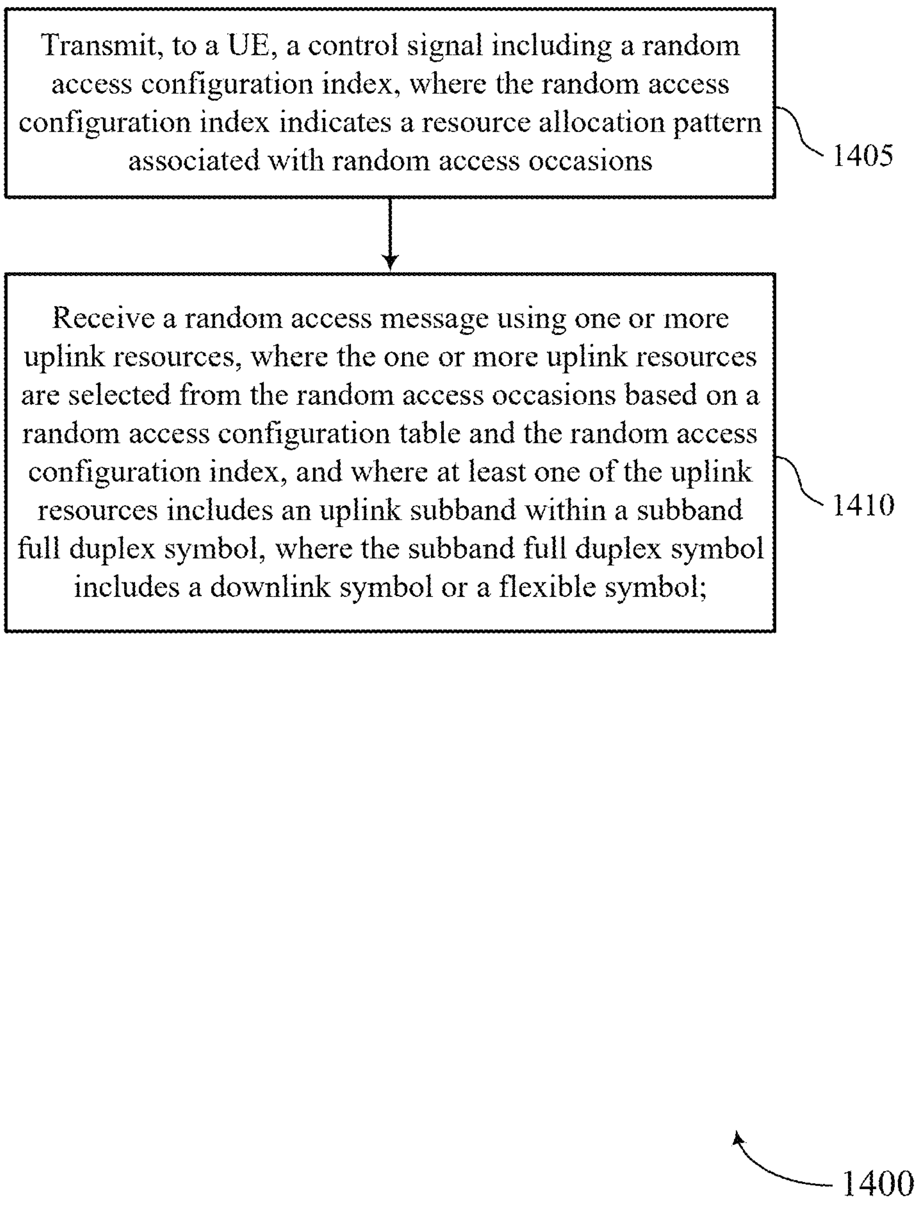

FIG. 14 shows a flowchart illustrating a method 1400 that supports techniques for communicating using subband full-duplex operation in accordance with one or more aspects of the present disclosure. The operations of the method 1400 may be implemented by a network entity or its components as described herein. For example, the operations of the method 1400 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1405, the method may include transmitting, to a UE, a control signal including a random access configuration index, where the random access configuration index indicates a resource allocation pattern associated with random access occasions. The operations of 1405 may be performed in accordance with examples as disclosed herein. In some examples, aspects of the operations of 1405 may be performed by a control signal component 1025 as described with reference to FIG. 10.

At 1410, the method may include receiving a random access message using one or more uplink resources, where the one or more uplink resources are selected from the random access occasions based on a random access configuration table and the random access configuration index, and where at least one of the uplink resources includes an uplink subband within a subband full duplex symbol, where the subband full duplex symbol includes a downlink symbol or a flexible symbol. The operations of 1410 may be performed in accordance with examples as disclosed herein. In some examples, aspects of the operations of 1410 may be performed by a random access message component 1030 as described with reference to FIG. 10.

Figure 15:
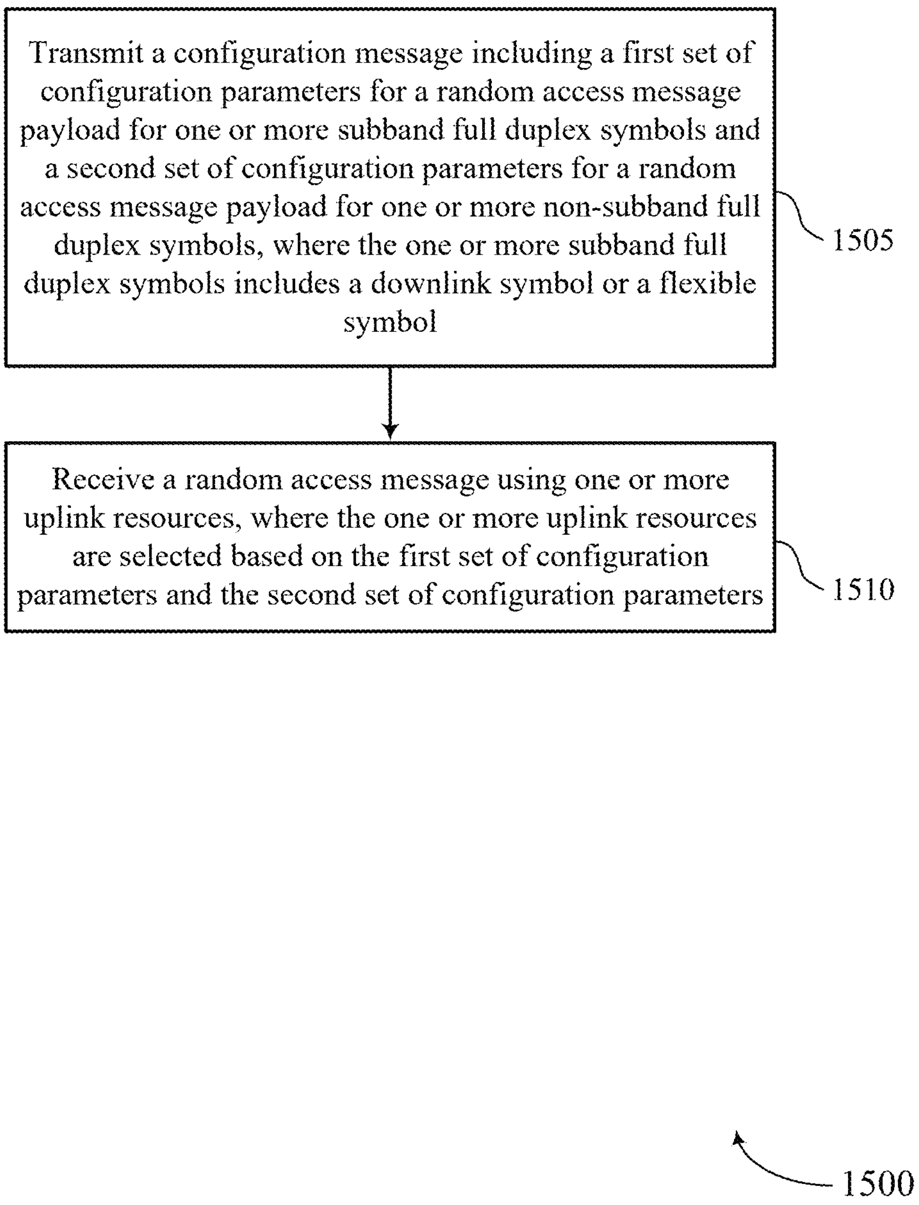

FIG. 15 shows a flowchart illustrating a method 1500 that supports techniques for communicating using subband full-duplex operation in accordance with one or more aspects of the present disclosure. The operations of the method 1500 may be implemented by a network entity or its components as described herein. For example, the operations of the method 1500 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include transmitting a configuration message including a first set of configuration parameters for a random access message payload for one or more subband full duplex symbols and a second set of configuration parameters for a random access message payload for one or more non-subband full duplex symbols, where the one or more subband full duplex symbols includes a downlink symbol or a flexible symbol. The operations of 1505 may be performed in accordance with examples as disclosed herein. In some examples, aspects of the operations of 1505 may be performed by a configuration message component 1035 as described with reference to FIG. 10.

At 1510, the method may include receiving a random access message using one or more uplink resources, where the one or more uplink resources are selected based on the first set of configuration parameters and the second set of configuration parameters. The operations of 1510 may be performed in accordance with examples as disclosed herein. In some examples, aspects of the operations of 1510 may be performed by a random access message component 1030 as described with reference to FIG. 10.

The following provides an overview of aspects of the present disclosure:

Aspect 1: A method for wireless communications at a UE, comprising: receiving a control signal comprising a random access configuration index, wherein the random access configuration index indicates a resource allocation pattern associated with random access occasions; selecting one or more uplink resources from the random access occasions for transmitting a random access message based at least in part on a random access configuration table and the random access configuration index, wherein at least one of the uplink resources comprises an uplink subband within a subband full duplex symbol, wherein the subband full duplex symbol comprises a downlink symbol or a flexible symbol; and transmitting the random access message using the one or more uplink resources.

Aspect 2: The method of aspect 1, wherein selecting the one or more uplink resources further comprises: selecting the one or more uplink resources from a frequency division duplex table associated with a first frequency range.

Aspect 3: The method of any of aspects 1 through 2, wherein selecting the one or more uplink resources further comprises: selecting the one or more uplink resources from a frequency division duplex table associated with a first frequency range; and selecting a second uplink resource of the one or more uplink resources from a time division duplex table associated with the first frequency range, wherein the second uplink resource comprises an uplink slot.

Aspect 4: The method of any of aspects 1 through 3, wherein selecting the one or more uplink resources further comprises: selecting the one or more uplink resources from one or more entries in a frequency division duplex table associated with a first frequency range, wherein the one or more entries are allocated to one or more random access occasions included in one or more subband full duplex symbols that are configured as the downlink symbol or the flexible symbol.

Aspect 5: The method of aspect 4, wherein the one or more entries correspond to subframe numbers or slot numbers or both.

Aspect 6: The method of any of aspects 1 through 5, wherein receiving the control signal further comprises: receiving the control signal comprising an indication of a location of one or more entries that are allocated to one or more random access occasions included in one or more subband full duplex symbols that are configured as a downlink symbol or a flexible symbol.

Aspect 7: The method of aspect 6, wherein the location corresponds to subframe numbers or slot numbers or both.

Aspect 8: The method of any of aspects 6 through 7, wherein the indication of the location comprises an indication of a time offset field.

Aspect 9: The method of any of aspects 1 through 8, wherein the UE comprises a half-duplex UE.

Aspect 10: A method for wireless communications at a UE, comprising: receiving a configuration message comprising a first set of configuration parameters for a random access message payload for one or more subband full duplex symbols and a second set of configuration parameters for a random access message payload for one or more non-subband full duplex symbols, wherein the one or more subband full duplex symbols comprises a downlink symbol or a flexible symbol; selecting one or more uplink resources for transmitting a random access message based at least in part on the first set of configuration parameters and the second set of configuration parameters; and transmitting the random access message using the one or more uplink resources.

Aspect 11: The method of aspect 10, wherein selecting the one or more uplink resources further comprises: selecting a first uplink resource of the one or more uplink resources based at least in part on applying a first frequency offset in accordance with the first set of configuration parameters; and selecting a second uplink resource associated with the one or more non-subband full duplex symbols based at least in part on applying a second frequency offset in accordance with the second set of configuration parameters, the second frequency offset being different from the first frequency offset.

Aspect 12: The method of any of aspects 10 through 11, wherein a quantity of physical resource blocks associated with a first uplink resource of the one or more uplink resources is less or more than a quantity of physical resource blocks associated with a second uplink resource associated with the one or more non-subband full duplex symbols.

Aspect 13: The method of any of aspects 10 through 12, wherein a quantity of symbols associated with a first uplink resource of the one or more uplink resources is greater or less than a quantity of symbols associated with a second uplink resource associated with the one or more non-subband full duplex symbols.

Aspect 14: The method of any of aspects 10 through 13, wherein selecting the one or more uplink resources further comprises: selecting a first uplink resource of the one or more uplink resources based at least in part on applying a first time offset in accordance with the first set of configuration parameters; and selecting a second uplink resource associated with the one or more non-subband full duplex symbols based at least in part on applying a second time offset in accordance with the second set of configuration parameters, the second time offset being different from the first time offset.

Aspect 15: The method of any of aspects 10 through 14, wherein a frequency domain multiplexing parameter associated with a first uplink resource of the one or more uplink resources is different from a frequency domain multiplexing parameter associated with a second uplink resource associated with the one or more non-subband full duplex symbols.

Aspect 16: A method for wireless communications at a network entity, comprising: transmitting, to a UE, a control signal comprising a random access configuration index, wherein the random access configuration index indicates a resource allocation pattern associated with random access occasions; and receiving a random access message using one or more uplink resources, wherein the one or more uplink resources are selected from the random access occasions based at least in part on a random access configuration table and the random access configuration index, and wherein at least one of the uplink resources comprises an uplink subband within a subband full duplex symbol, wherein the subband full duplex symbol comprises a downlink symbol or a flexible symbol.

Aspect 17: The method of aspect 16, wherein the one or more uplink resources from a frequency division duplex table associated with a first frequency range.

Aspect 18: The method of any of aspects 16 through 17, wherein the one or more uplink resources are selected from a frequency division duplex table associated with a first frequency range, and a second uplink resource of the one or more uplink resources are selected from a time division duplex table associated with the first frequency range, the second uplink resource comprises an uplink slot.

Aspect 19: The method of any of aspects 16 through 18, wherein the one or more uplink resources are selected from one or more entries in a frequency division duplex table associated with a first frequency range, and the one or more entries are allocated to one or more random access occasions included in one or more subband full duplex symbols that are configured as the downlink symbol or the flexible symbol.

Aspect 20: The method of aspect 19, wherein the one or more entries correspond to subframe numbers or slot numbers or both.

Aspect 21: The method of any of aspects 16 through 20, wherein transmitting the control signal further comprises: transmitting the control signal comprising an indication of a location of one or more entries that are allocated to one or more random access occasions included in one or more subband full duplex symbols that are configured as a downlink symbol or a flexible symbol.

Aspect 22: The method of aspect 21, wherein the location corresponds to subframe numbers or slot numbers or both.

Aspect 23: The method of any of aspects 21 through 22, wherein the indication of the location comprises an indication of a time offset field.

Aspect 24: The method of any of aspects 16 through 23, wherein the UE comprises a half-duplex UE.

Aspect 25: A method for wireless communications at a network entity, comprising: transmitting a configuration message comprising a first set of configuration parameters for a random access message payload for one or more subband full duplex symbols and a second set of configuration parameters for a random access message payload for one or more non-subband full duplex symbols, wherein the one or more subband full duplex symbols comprises a downlink symbol or a flexible symbol; and receiving a random access message using one or more uplink resources, wherein the one or more uplink resources are selected based at least in part on the first set of configuration parameters and the second set of configuration parameters.

Aspect 26: The method of aspect 25, wherein a first uplink resource of the one or more uplink resources is selected based at least in part on applying a first frequency offset in accordance with the first set of configuration parameters, and a second uplink resource associated with the one or more non-subband full duplex symbols are selected based at least in part on applying a second frequency offset in accordance with the second set of configuration parameters, the second frequency offset being different from the first frequency offset.

Aspect 27: The method of any of aspects 25 through 26, wherein a quantity of physical resource blocks associated with a first uplink resource of the one or more uplink resources is less or more than a quantity of physical resource blocks associated with a second uplink resource associated with the one or more non-subband full duplex symbols.

Aspect 28: The method of any of aspects 25 through 27, wherein a quantity of symbols associated with a first uplink resource of the one or more uplink resources is greater or less than a quantity of symbols associated with a second uplink resource associated with the one or more non-subband full duplex symbols.

Aspect 29: The method of any of aspects 25 through 28, wherein a first uplink resource of the one or more uplink resources is selected based at least in part on applying a first time offset in accordance with the first set of configuration parameters, and a second uplink resource associated with the one or more non-subband full duplex symbols is selected based at least in part on applying a second time offset in accordance with the second set of configuration parameters, the second time offset being different from the first time offset.

Aspect 30: The method of any of aspects 25 through 29, wherein a frequency domain multiplexing parameter associated with a first uplink resource of the one or more uplink resources is different from a frequency domain multiplexing parameter associated with a second uplink resource associated with the one or more non-subband full duplex symbols.

Aspect 31: A UE for wireless communications, comprising one or more memories storing processor-executable code, and one or more processors coupled with the one or more memories and individually or collectively operable to execute the code to cause the UE to perform a method of any of aspects 1 through 9.

Aspect 32: A UE for wireless communications, comprising at least one means for performing a method of any of aspects 1 through 9.

Aspect 33: A non-transitory computer-readable medium storing code for wireless communications, the code comprising instructions executable by one or more processors to perform a method of any of aspects 1 through 9.

Aspect 34: A UE for wireless communications, comprising one or more memories storing processor-executable code, and one or more processors coupled with the one or more memories and individually or collectively operable to execute the code to cause the UE to perform a method of any of aspects 10 through 15.

Aspect 35: A UE for wireless communications, comprising at least one means for performing a method of any of aspects 10 through 15.

Aspect 36: A non-transitory computer-readable medium storing code for wireless communications, the code comprising instructions executable by one or more processors to perform a method of any of aspects 10 through 15.

Aspect 37: A network entity for wireless communications, comprising one or more memories storing processor-executable code, and one or more processors coupled with the one or more memories and individually or collectively operable to execute the code to cause the network entity to perform a method of any of aspects 16 through 24.

Aspect 38: A network entity for wireless communications, comprising at least one means for performing a method of any of aspects 16 through 24.

Aspect 39: A non-transitory computer-readable medium storing code for wireless communications, the code comprising instructions executable by one or more processors to perform a method of any of aspects 16 through 24.

Aspect 40: A network entity for wireless communications, comprising one or more memories storing processor-executable code, and one or more processors coupled with the one or more memories and individually or collectively operable to execute the code to cause the network entity to perform a method of any of aspects 25 through 30.

Aspect 41: A network entity for wireless communications, comprising at least one means for performing a method of any of aspects 25 through 30.

Aspect 42: A non-transitory computer-readable medium storing code for wireless communications, the code comprising instructions executable by one or more processors to perform a method of any of aspects 25 through 30.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
- one or more memories storing processor-executable code; and
- one or more processors coupled with the one or more memories and individually or collectively operable to execute the code to cause the UE to:
  - receive a control signal comprising a random access configuration index and an indication of a time offset field of one or more entries that are allocated to one or more random access occasions included in one or more subband full duplex symbols that are configured as a downlink symbol or a flexible symbol, wherein the random access configuration index indicates a resource allocation pattern associated with random access occasions;
  - select one or more uplink resources from the random access occasions for transmitting a random access message based at least in part on a random access configuration table and the random access configuration index, wherein at least one of the uplink resources comprises an uplink subband within a subband full duplex symbol, wherein the subband full duplex symbol comprises a downlink symbol or a flexible symbol; and
  - transmit the random access message using the one or more uplink resources.

2. The UE of claim 1, wherein, to select the one or more uplink resources, the one or more processors are individually or collectively further operable to execute the code to cause the UE to:
- select the one or more uplink resources from a frequency division duplex table associated with a first frequency range.

3. The UE of claim 1, wherein, to select the one or more uplink resources, the one or more processors are individually or collectively further operable to execute the code to cause the UE to:
- select the one or more uplink resources from a frequency division duplex table associated with a first frequency range; and
- select a second uplink resource of the one or more uplink resources from a time division duplex table associated with the first frequency range, wherein the second uplink resource comprises an uplink slot.

4. The UE of claim 1, wherein, to select the one or more uplink resources, the one or more processors are individually or collectively further operable to execute the code to cause the UE to:

select the one or more uplink resources from one or more entries in a frequency division duplex table associated with a first frequency range, wherein the one or more entries are allocated to one or more random access occasions included in one or more subband full duplex symbols that are configured as the downlink symbol or the flexible symbol.

5. The UE of claim 4, wherein the one or more entries correspond to subframe numbers or slot numbers or both.

6. The UE of claim 1, wherein, to receive the control signal, the one or more processors are individually or collectively further operable to execute the code to cause the UE to:

receive the control signal comprising an indication of a location of one or more entries that are allocated to one or more random access occasions included in one or more subband full duplex symbols that are configured as a downlink symbol or a flexible symbol.

7. The UE of claim 6, wherein the location corresponds to subframe numbers or slot numbers or both.

8. The UE of claim 1, wherein the UE comprises a half-duplex UE.

9. A user equipment (UE), comprising:

one or more memories storing processor-executable code; and one or more processors coupled with the one or more memories and individually or collectively operable to execute the code to cause the UE to:

receive a configuration message comprising a first set of configuration parameters for a random access message payload for one or more subband full duplex symbols and a second set of configuration parameters for a random access message payload for one or more non-subband full duplex symbols, wherein the one or more subband full duplex symbols comprises a downlink symbol or a flexible symbol;

select a first uplink resource of the one or more uplink resources based at least in part on applying a first time offset in accordance with the first set of configuration parameters;

select a second uplink resource associated with the one or more non-subband full duplex symbols based at least in part on applying a second time offset in accordance with the second set of configuration parameters, the second time offset being different from the first time offset; and transmit the random access message using the one or more uplink resources.

10. The UE of claim 9, wherein, to select the one or more uplink resources, the one or more processors are individually or collectively further operable to execute the code to cause the UE to:

select a first uplink resource of the one or more uplink resources based at least in part on applying a first frequency offset in accordance with the first set of configuration parameters; and select a second uplink resource associated with the one or more non-subband full duplex symbols based at least in part on applying a second frequency offset in accordance with the second set of configuration parameters, the second frequency offset being different from the first frequency offset.

11. The UE of claim 9, wherein a quantity of physical resource blocks associated with a first uplink resource of the one or more uplink resources is less or more than a quantity of physical resource blocks associated with a second uplink resource associated with the one or more non-subband full duplex symbols.

12. The UE of claim 9, wherein a quantity of symbols associated with a first uplink resource of the one or more uplink resources is greater or less than a quantity of symbols associated with a second uplink resource associated with the one or more non-subband full duplex symbols.

13. The UE of claim 9, wherein a frequency domain multiplexing parameter associated with a first uplink resource of the one or more uplink resources is different from a frequency domain multiplexing parameter associated with a second uplink resource associated with the one or more non-subband full duplex symbols.

14. A method for wireless communications at a user equipment (UE), comprising:

receiving a control signal comprising a random access configuration index and an indication of a time offset field of one or more entries that are allocated to one or more random access occasions included in one or more subband full duplex symbols that are configured as a downlink symbol or a flexible symbol, wherein the random access configuration index indicates a resource allocation pattern associated with random access occasions;

selecting one or more uplink resources from the random access occasions for transmitting a random access message based at least in part on a random access configuration table and the random access configuration index, wherein at least one of the uplink resources comprises an uplink subband within a subband full duplex symbol, wherein the subband full duplex symbol comprises a downlink symbol or a flexible symbol; and transmitting the random access message using the one or more uplink resources.

15. The method of claim 14, wherein selecting the one or more uplink resources further comprises:

selecting the one or more uplink resources from a frequency division duplex table associated with a first frequency range.

16. The method of claim 14, wherein selecting the one or more uplink resources further comprises:

selecting the one or more uplink resources from a frequency division duplex table associated with a first frequency range; and selecting a second uplink resource of the one or more uplink resources from a time division duplex table associated with the first frequency range, wherein the second uplink resource comprises an uplink slot.

17. The method of claim 14, wherein selecting the one or more uplink resources further comprises:

selecting the one or more uplink resources from one or more entries in a frequency division duplex table associated with a first frequency range, wherein the one or more entries are allocated to one or more random access occasions included in one or more subband full duplex symbols that are configured as the downlink symbol or the flexible symbol.

18. The method of claim 17, wherein the one or more entries correspond to subframe numbers or slot numbers or both.

* * * * *